United States Patent
Nakajima et al.

(10) Patent No.: US 7,959,980 B2
(45) Date of Patent: *Jun. 14, 2011

(54) HYDROPHILIC COMPOSITIONS, METHODS FOR THEIR PRODUCTION, AND SUBSTRATES COATED WITH SUCH COMPOSITIONS

(75) Inventors: Masayuki Nakajima, Wexford, PA (US); Chia-Cheng Lin, Allison Park, PA (US); Shan Cheng, Pittsburgh, PA (US); James P. Colton, Trafford, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 1050 days.

This patent is subject to a terminal disclaimer.

(21) Appl. No.: 11/131,986

(22) Filed: May 18, 2005

(65) Prior Publication Data

US 2005/0266981 A1 Dec. 1, 2005

Related U.S. Application Data

(60) Provisional application No. 60/575,437, filed on May 28, 2004.

(51) Int. Cl.
*B01J 31/00* (2006.01)
*B01J 23/00* (2006.01)
*C09C 1/36* (2006.01)
*B05D 3/02* (2006.01)
*B05D 3/00* (2006.01)

(52) U.S. Cl. .......... 427/387; 427/372.2; 427/385.5; 427/389.7; 427/393.6; 106/436; 502/150; 502/158; 502/350

(58) Field of Classification Search .......... 106/443, 106/426, 428, 430, 431, 436; 502/150, 158, 502/208, 350, 340; 428/141, 446; 427/372.2, 427/387, 385.5, 389.7, 393.6
See application file for complete search history.

(56) References Cited

U.S. PATENT DOCUMENTS

| | | | | |
|---|---|---|---|---|
| 3,986,997 | A | 10/1976 | Clark | 260/29.2 M |
| 4,211,823 | A | 7/1980 | Suzuki et al. | 428/412 |
| 4,753,827 | A | 6/1988 | Yoldas et al. | 427/387 |
| 4,754,012 | A | 6/1988 | Yoldas et al. | 528/10 |
| 4,799,963 | A | 1/1989 | Basil et al. | 106/287.13 |
| 5,035,745 | A | 7/1991 | Lin et al. | 106/287.16 |
| 5,199,979 | A | 4/1993 | Lin et al. | 106/287.14 |
| 5,305,827 | A * | 4/1994 | Steele et al. | 165/133 |

(Continued)

FOREIGN PATENT DOCUMENTS

EP 1 146 099 A2 10/2001

(Continued)

OTHER PUBLICATIONS

Science, vol. 297, Sep. 27, 2002, Shahed U. M. Khan et al, pp. 2243-2245, "Efficient Photochemical Water Splitting by a Chemically Modified n-$TiO_2$".

(Continued)

*Primary Examiner* — Anthony J Green
*Assistant Examiner* — Pegah Parvini
(74) *Attorney, Agent, or Firm* — Donald R. Palladino

(57) ABSTRACT

Liquid compositions are disclosed that include a photocatalytic material and a hydrophilic binder that includes an essentially completely hydrolyzed organosilicate. Also disclosed are methods of making such compositions, methods of coating a substrate with a hydrophilic composition, and substrates coated with such compositions. The compositions may, for example, be embodied as stable one-pack compositions.

12 Claims, 4 Drawing Sheets

U.S. PATENT DOCUMENTS

| | | | |
|---|---|---|---|
| 5,349,002 A | 9/1994 | Patel | 428/412 |
| 5,514,466 A | 5/1996 | Yamada et al. | 428/328 |
| 5,616,532 A | 4/1997 | Heller et al. | 502/242 |
| 5,733,644 A | 3/1998 | Tanaka et al. | 428/215 |
| 5,755,867 A | 5/1998 | Chikuni et al. | 106/287.16 |
| 5,800,606 A | 9/1998 | Tanaka et al. | 106/287.16 |
| 5,849,200 A | 12/1998 | Heller et al. | 210/748 |
| 5,853,866 A | 12/1998 | Watanabe et al. | 428/312.8 |
| 5,854,169 A | 12/1998 | Heller et al. | 502/242 |
| 5,874,701 A | 2/1999 | Watanabe et al. | 204/157.15 |
| 5,908,497 A | 6/1999 | Morfesis et al. | 106/287.18 |
| 5,939,194 A | 8/1999 | Hashimoto et al. | 428/411.1 |
| 5,961,843 A | 10/1999 | Hayakawa et al. | 210/748 |
| 5,981,425 A | 11/1999 | Taoda et al. | 502/208 |
| 6,013,372 A | 1/2000 | Hayakawa et al. | 428/411.1 |
| 6,013,724 A | 1/2000 | Mizutani et al. | 524/588 |
| 6,027,766 A | 2/2000 | Greenberg et al. | 427/226 |
| 6,042,737 A | 3/2000 | Basil et al. | 216/37 |
| 6,090,489 A | 7/2000 | Hayakawa et al. | 428/409 |
| 6,093,676 A | 7/2000 | Heller et al. | 502/242 |
| 6,103,363 A | 8/2000 | Boire et al. | 428/325 |
| 6,106,605 A | 8/2000 | Basil et al. | 106/287.12 |
| 6,165,256 A | 12/2000 | Hayakawa et al. | 106/13 |
| 6,191,062 B1 | 2/2001 | Hayakawa et al. | 502/159 |
| 6,239,050 B1 | 5/2001 | Lammon-Hilinski et al. | 442/180 |
| 6,251,981 B1 | 6/2001 | Tanaka et al. | 524/457 |
| 6,258,969 B1 | 7/2001 | Sawai et al. | 556/457 |
| 6,268,050 B1 | 7/2001 | Watanabe et al. | 428/312.8 |
| 6,291,697 B1 | 9/2001 | Tanaka et al. | 556/457 |
| 6,294,313 B1 | 9/2001 | Kobayashi et al. | 430/302 |
| 6,300,559 B1 | 10/2001 | Ohmori | 136/263 |
| 6,303,229 B2 | 10/2001 | Takahama et al. | 428/447 |
| 6,306,343 B1 | 10/2001 | Sugiyama | 422/4 |
| 6,326,079 B1 | 12/2001 | Philippe et al. | 428/325 |
| 6,337,129 B1 | 1/2002 | Watanabe et al. | 428/328 |
| 6,362,121 B1 | 3/2002 | Chopin et al. | 502/2 |
| 6,368,668 B1 | 4/2002 | Kobayashi et al. | 427/376.2 |
| 6,383,980 B1 | 5/2002 | Hagihara et al. | 502/340 |
| 6,387,844 B1 | 5/2002 | Fujishima et al. | 502/350 |
| 6,407,156 B1 | 6/2002 | Hagihara et al. | 524/494 |
| 6,413,581 B1 | 7/2002 | Greenberg et al. | 427/226 |
| 6,479,031 B2 | 11/2002 | Ohmori et al. | 423/610 |
| 6,524,664 B1 | 2/2003 | Hashimoto et al. | 427/558 |
| 6,531,215 B2 | 3/2003 | Yamazaki et al. | 428/336 |
| 6,599,976 B2 | 7/2003 | Kobayashi et al. | 524/837 |
| 6,680,135 B2 | 1/2004 | Boire et al. | 428/702 |
| 7,211,543 B2 * | 5/2007 | Nababayashi et al. | 502/350 |
| 2002/0023800 A1 * | 2/2002 | Ohmori et al. | 181/294 |
| 2002/0028361 A1 | 3/2002 | Boire et al. | 428/701 |
| 2002/0071956 A1 | 6/2002 | Boire et al. | 428/432 |
| 2002/0107144 A1 | 8/2002 | Fujishima et al. | 502/350 |
| 2002/0119307 A1 | 8/2002 | Boire et al. | 428/336 |
| 2002/0136934 A1 | 9/2002 | Boire et al. | 428/701 |
| 2002/0150681 A1 | 10/2002 | Boire et al. | 427/255.36 |
| 2002/0160910 A1 * | 10/2002 | Sanbayashi et al. | 502/208 |
| 2002/0169076 A1 | 11/2002 | Takeshi et al. | 502/350 |
| 2003/0110638 A1 | 6/2003 | Tapper | 30/90.1 |
| 2003/0155299 A1 | 8/2003 | Carvin et al. | 210/634 |
| 2003/0207991 A1 | 11/2003 | Kobayashi et al. | 524/837 |
| 2004/0110012 A1 | 6/2004 | Bier et al. | 428/422.8 |

FOREIGN PATENT DOCUMENTS

| | | | |
|---|---|---|---|
| EP | 966409 | | 2/2003 |
| EP | 1 512 728 A1 | | 3/2005 |
| JP | 8-164334 | | 6/1996 |
| JP | 2000129175 | * | 5/2000 |
| JP | 2000129176 | * | 5/2000 |
| JP | 2000-351940 | * | 12/2000 |
| WO | WO 02/06159 | * | 1/2002 |
| WO | WO 03/101615 | * | 12/2003 |

OTHER PUBLICATIONS

Journal of Materials Science, 39 (2004) T. Kako et al, pp. 547-555, "Adhesion and Sliding of Wet Snow on a Super-Hydrophobic Surface with Hydrophilic Channels".

Surface and Interface Analysis, 36, (2004) J. P. Matinlinna et al, pp. 246-253, "Surface Analysis of Co-Cr-Mo Alloy and Ti Substrates Silanized with Trialkoxysilanes and Silane Mixtures".

Material Safety Data Sheet, Mar. 9, 2004, Ser. No. 11, Brand Name—Blue Active EX-01.

Material Safety Data Sheet, Mar. 9, 2004, Ser. No. 12, Brand Name—Blue Active EX-1.

* cited by examiner

HYDROPHILIC COMPOSITIONS, METHODS FOR THEIR PRODUCTION, AND SUBSTRATES COATED WITH SUCH COMPOSITIONS

CROSS-REFERENCE TO RELATED APPLICATIONS

This application claims the benefit of U.S. Provisional Patent Application Ser. No. 60/575,437, filed May 28, 2004. This application is also related to U.S. patent application Ser. No. 11/132,110, now U.S. Pat. No. 7,354,624, and U.S. patent application Ser. No. 11/131,985, now U.S. Pat. No. 7,354,650.

FIELD OF THE INVENTION

The present invention relates to liquid compositions that include a photocatalytic material dispersed in a hydrophilic binder that includes an essentially completely hydrolyzed organosilicate. The liquid compositions may be embodied as coating compositions. In particular, the liquid compositions may be employed as, for example, stable one-pack coating compositions that form hydrophilic and durable coatings that may exhibit advantageous, easy-to-clean, self-cleaning, anti-fouling, anti-fogging, anti-static and/or anti-bacterial properties. Coatings formed from such liquid compositions can be rendered super-hydrophilic upon photoexcitation of the photocatalytic material.

BACKGROUND OF THE INVENTION

Hydrophilic coatings are advantageous for certain coating applications, such as where coated surfaces exhibiting anti-fouling, easy-to-clean, self-cleaning, and/or anti-fogging properties are desired. Such coatings can be particularly useful, by way of example, for application to surfaces exposed to the outdoor environment. Building structures as well as other articles that are exposed to the outdoors are likely to come in contact with various contaminants, such as dirt, oil, dust, and clay, among others. Rainfall, for example, can be laden with such contaminants. A surface with a hydrophilic coating deposited thereon may be anti-fouling by preventing contaminants in rainwater from adhering to the surface when the rainwater flows down along the coated surface. Moreover, during fair weather, air-born contaminants may come in contact with and adhere to surfaces. A surface with a hydrophilic coating deposited thereon may be self-cleaning because the coating has the ability to wash those contaminants away when the surface comes in contact with water, such as during a rainfall.

Coatings having self-cleaning and/or anti-fouling properties may also be advantageous for application to surfaces that are exposed to indoor contaminants, such as, for example, kitchen contaminants, such as oil and/or fat. An article with a hydrophilic coating deposited thereon can be soaked in, wetted with, or rinsed by water to release contaminants from the coating and remove them from the surface of the article without use of a detergent.

Coatings having anti-fogging properties can be particularly useful in many applications as well. For example, articles containing surfaces where visibility is important, such as windshields, windowpanes, eyeglass lenses, mirrors, and other similar articles can benefit from a coating with anti-fogging properties because they contain surfaces that can often be fogged by steam or moisture condensate or blurred by water droplets adhering to the surface thereof. It is known that the fogging of a surface of an article results when the surface is held at a temperature lower than the dew point of the ambient atmosphere, thereby causing condensation moisture in the ambient air to occur and form moisture condensate at the surface of the article. If the condensate particles are sufficiently small, so that the diameter thereof is about one half of the wavelength of the visible light, the particles can cause scattering of light, whereby the surface becomes apparently opaque, causing a loss of visibility.

A surface with a hydrophilic coating deposited thereon may be anti-fogging because such a coating can transform condensate particles to a relatively uniform film of water, without forming discrete water droplets. Similarly, a surface with a hydrophilic coating deposited thereon can prevent rainfall or water splashes from forming discrete water droplets on the surface, thereby improving visibility through windows, mirrors, and/or eyewear.

In view of these and other advantages, various hydrophilic coating compositions have been proposed. Some of these coatings achieve their hydrophilicity through the action of a photocatalytic material that is dispersed in a silicon-containing binder. For example, U.S. Pat. No. 5,755,867 ("the '867 patent") discloses a particulate photocatalyst dispersed in a coat-forming element. The photocatalyst preferably consists of titanium dioxide particles having a mean particle size of 0.1 micron or less, where the titanium dioxide may be used in either the anatase or rutile form. The coat-forming element is capable of forming a coating of silicone resin when cured and is comprised of an organopolysiloxane formed by partial hydrolysis of hydrolyzable silanes followed by polycondensation. In the '867 patent, the silicone coat-forming element in itself is considerably hydrophobic, but upon excitation of the dispersed photocatalyst, a high degree of water affinity, i.e., hydrophilicity, can be imparted to the coating.

Japanese Patent Application JP-8-164334A discloses a coating film-forming composition comprising titanium oxide having an average particle diameter of 1 to 500 nanometers, a hydrolyzate of a hydrolyzable silicon compound, and a solvent. The hydrolyzable silicon compound is an alkyl silicate condensate expressed by the formula $Si_nO_{n-1}(OR)_{2n+2}$ (where n is 2 to 6, and R is a C1-C4 alkyl group). The hydrolyzate results from hydrolyzing the alkyl silicate condensate at a hydrolysis percentage of 50 to 1500%. The hydrolyzate itself, however, is not believed to be hydrophilic.

U.S. Pat. Nos. 6,013,372 and 6,090,489 disclose photocatalytic coating compositions wherein particles of a photocatalyst are dispersed in a film-forming element of uncured or partially cured silicone (organopolysiloxane) or a precursor thereof. The photocatalyst may include particles of a metal oxide, such as the anatase and rutile forms of titanium dioxide. According to these patents, the coating compositions are applied on the surface of a substrate and the film-forming element is then subjected to curing. Then, upon photoexcitation of the photocatalyst, the organic groups bonded to the silicon atoms of the silicone molecules of the film-forming element are substituted with hydroxyl groups under the photocatalytic action of the photocatalyst. The surface of the photocatalytic coating is thereby "superhydrophilified," i.e., the surface is rendered highly hydrophilic to the degree that the contact angle with water becomes less than about 10°. In these patents, however, the film-forming element in itself is considerably hydrophobic, i.e., the initial contact angle with water is greater than 50°. As a result, the coating is initially hydrophobic, and it is only upon excitation of the dispersed photocatalyst that hydrophilicity is imparted to the coating.

U.S. Pat. No. 6,165,256 discloses compositions that can hydrophilify the surface of a member to impart anti-fogging properties to the surface of the member. The compositions disclosed in this patent comprise (a) photocatalytic particles of a metallic oxide, (b) a precursor capable of forming a silicone resin film or a precursor capable of forming a silica film, and (c) a solvent, such as water, organic solvents, and mixtures thereof. The solvent is added in an amount such that the total content of the photocatalytic particle and the solid matter of the precursor in the composition is 0.01 to 5% by weight. As in the previous examples, however, hydrophilification of the coating formed from such a composition takes place upon photoexcitation of the photocatalyst, while the film forming material in itself is not hydrophilic. Therefore, such a coating is not believed to be hydrophilic prior to excitation of the photocatalyst.

These prior art hydrophilic coatings that achieve their hydrophilicity through the action of a photocatalytic material that is dispersed in a silicon-containing binder suffer, however, from some drawbacks. One notable drawback is that these coatings do not exhibit hydrophilicity until photoexcitation of the photocatalyst. In addition, these compositions typically require a forced cure, i.e., they cannot be efficiently cured at room temperatures.

U.S. Pat. No. 6,303,229 ("the '229 patent") discloses another composition that may include a photocatalytic material. The coating disclosed in the '229 patent is formed from applying a coating composition that contains a silicone resin, which acts as the binder and which is obtained by hydrolyzing and condensation-polymerizing certain tetra-functional alkoxysilanes. The coating compositions may also include colloidal silica. Evidently, the coated film formed from the composition disclosed in the '229 patent can be initially hydrophilic. This initial hydrophilicity, however, is believed to result from the presence of colloidal silica in the composition rather than the silicone resin itself. It is believed that the silicone resin disclosed in the '229 patent is not itself hydrophilic because the desired pH of the resin is 3.8 to 6, which indicates that Si—OR groups exist in the resin in an amount to prevent gellation and hydrophilicity. As a result, such a coating suffers from some drawbacks. For example, such a coating that includes a photocatalytic material cannot be effectively applied directly over an organic base material without the inclusion of a primer layer between the substrate and the coating composition containing the silicon resin. Moreover, the inclusion of colloidal silica in the coating composition will cause iridescence when the composition is applied over an organic substrate at larger film thicknesses.

As a result, it would be advantageous to provide a composition that includes a photocatalytic material and a binder, wherein the coating formed from such a composition can be hydrophilic prior to excitation of the photocatalyst and can be rendered super-hydrophilic upon excitation of the photocatalyst. It would also be advantageous to provide compositions of this type that have low haze, can be efficiently cured at ambient temperatures, and/or that maintain their hydrophilicity for long periods of time when exposed to a dark state. Moreover, it would be advantageous to embody such compositions in the form of a stable one-pack product.

SUMMARY OF THE INVENTION

Figure 1:
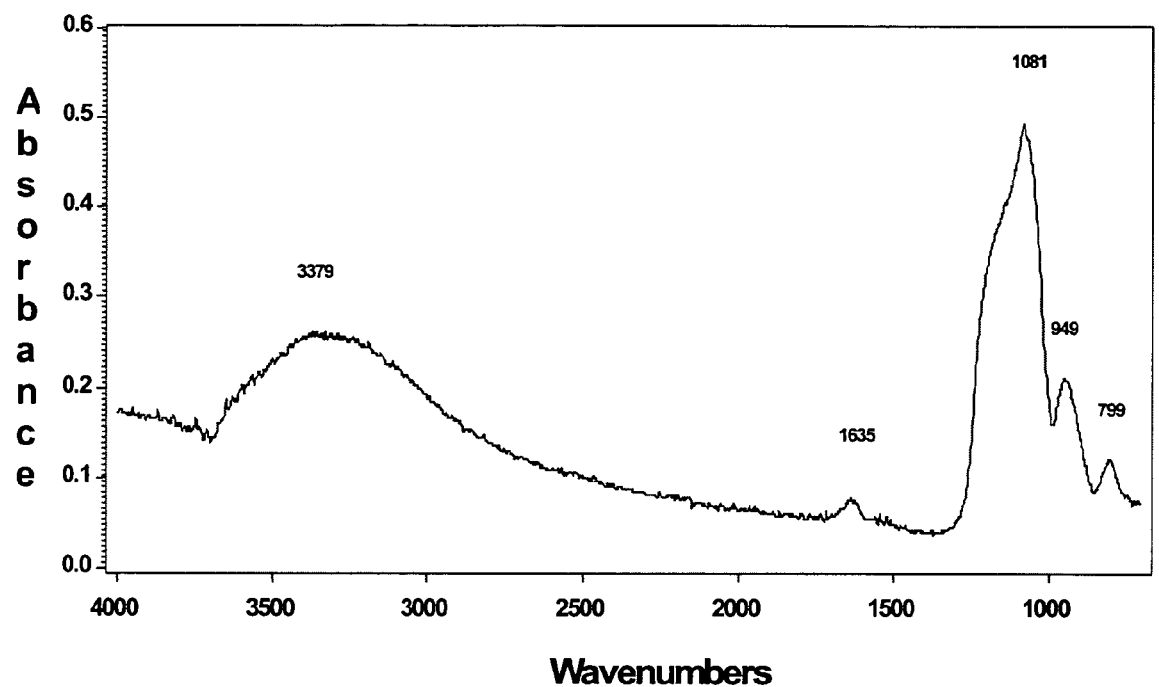
FIG. 1 is a chart reflecting a Fourier Transform Infrared Spectroscopy ("FTIR") analysis of a dry film formed from a hydrophilic binder material in accordance with certain non-limiting embodiments of the present invention.

In one respect, the present invention is directed to liquid compositions, such as coating compositions, comprising (a) a photocatalytic material, and (b) a binder. The binder of the compositions of the present invention is hydrophilic and comprises an essentially completely hydrolyzed organosilicate.

In another respect, the present invention is directed to methods of making such liquid compositions, one-pack liquid compositions, methods of coating a substrate with such liquid compositions, and substrates coated with the liquid compositions of the present invention.

DETAILED DESCRIPTION OF EMBODIMENTS OF THE INVENTION

For purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

In this application, the use of the singular includes the plural and plural encompasses singular, unless specifically stated otherwise. For example, and without limitation, this application refers to liquid compositions that comprise "a photocatalytic material". Such references to "a photocatalytic material" is meant to encompass compositions comprising one photocatalytic material as well as compositions that comprise more than one photocatalytic material, such as compositions that comprise two different photocatalytic materials. In addition, in this application, the use of "or" means "and/or" unless specifically stated otherwise, even though "and/or" may be explicitly used in certain instances.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

The present invention is directed to liquid compositions, such as coating compositions, comprising (a) a photocatalytic material, and (b) a binder. The binder of the compositions of the present invention is hydrophilic and comprises an essentially completely hydrolyzed organosilicate.

The liquid compositions of the present invention comprise a photocatalytic material. As used herein, the term "photocatalytic material" refers to a material that is photoexcitable upon exposure to, and absorption of, radiation, such as ultraviolet or visible radiation. A photocatalytic material is a material that, when exposed to light having higher energy than the energy gap between the conduction band and the valence band of the crystal, causes excitation of electrons in the valence band to produce a conduction electron thereby leaving a hole behind on the particular valence band. In certain embodiments of the present invention, the photocatalytic material comprises a metal oxide, such as zinc oxide, tin oxide, ferric oxide, dibismuth trioxide, tungsten trioxide, strontium titanate, titanium dioxide, or mixtures thereof.

In certain embodiments of the present invention, at least a portion of the photocatalytic material is present in the liquid composition in the form of particles having an average crystalline diameter of 1 to 100 nanometers, such as 3 to 35 nanometers, or, in yet other embodiments, 7 to 20 nanometers. In these embodiments, the average crystalline diameter of the particles can range between any combination of the recited values, inclusive of the recited values. It will be understood by those skilled in the art that the average crystalline diameter of the particles may be selected based upon the properties desired to be incorporated into the liquid composition. In some embodiments, substantially all of the photocatalytic material is present in the form of such particles. The average crystalline diameter of the photocatalytic metallic oxide particles may be determined by scanning electron microscope or transmission electro-microscope and the crystal phase of such particles may be determined by X-ray diffraction, as known by those skilled in the art.

As mentioned above, certain materials may be photocatalytic upon exposure to, and absorption of, for example, ultraviolet ("UV"), and/or visible radiation. In certain embodiments of the present invention, the photocatalytic material comprises materials that are photoexcitable by one or more of these mechanisms. Examples of materials that may be used in the present invention and which are photocatalytic upon exposure to UV radiation include, without limitation, tin oxide, zinc oxide, and the brookite, anatase and rutile forms of titanium dioxide. Examples of materials that may be used in the present invention and which are photocatalytic upon, exposure to visible radiation include, without limitation, the brookite form of titanium oxide, titanium dioxide chemically modified via flame pyrolysis of titanium metal, nitrogen doped titanium dioxide, and plasma treated titanium dioxide.

In certain embodiments of the present invention, the photocatalytic material is provided in the form of a sol comprising particles of photocatalytic material dispersed in water, such as a titania sol. Such sols are readily available in the marketplace. Examples of such materials, which are suitable for use in the present invention, include, without limitation, S5-300A and S5-33B available from Millenium Chemicals, STS-01, STS-02, and STS-21 available from Ishihara Sangyo Corporation, and NTB-1, NTB-13 and NTB-200 available from Showa Denko Corporation.

In certain embodiments of the present invention, the photocatalytic material is present in the form of a sol comprising brookite-type titanium oxide particles or a mixture of brookite-type with anatase-type and/or rutile-type titanium oxide particles dispersed in water. Such sols can be prepared by hydrolysis of titanium tetrachloride under certain conditions, such as is taught by U.S. Pat. No. 6,479,031, which is incorporated herein by reference. Sols of this type which are suitable for use in the present invention include, without limitation, NTB-1 and NTB-13 titania sols available from Showa Denko Corporation.

In certain embodiments of the present invention, the photocatalytic material comprises chemically modified titanium dioxide. Examples of such materials include titanium dioxide chemically modified by flame pyrolysis as described by Khan et al., *Efficient Photochemical Water Splitting by a Chemically Modified n-TiO$_2$*, Science Reprint, Volume 297, pp. 2243-2245-(2002), which is incorporated herein by reference, nitrogen-doped titanium oxide manufactured as described in U.S. Patent Application Publication 2002/0169076A1 at, for example, paragraphs. [0152] to [0203], which is incorporated herein by reference, and/or plasma treated titanium dioxide as described in U.S. Pat. No. 6,306,343 at col. 2, line 49 to col. 7, line 17, which is incorporated herein by reference.

In certain embodiments of the present invention, the amount of the photocatalytic material that is present in the liquid composition ranges from 0.05 to 5 percent solids by weight, such as 0.1 to 0.75 percent solids by weight, with percent solids by weight being based on the total solution weight of the composition. In these embodiments, the amount of photocatalytic material that may be preset in the liquid composition can range between any-combination of the recited values, inclusive of the recited values. It will be understood by those skilled in the art that the amount of photocatalytic material present in the liquid composition is determined by the properties desired to be incorporated into the composition.

The liquid compositions of the present invention also comprise a hydrophilic binder. As used herein, the term "binder" refers to a continuous material in which particles of the photocatalytic material are dispersed. As used herein, the term "hydrophilic binder" means that the binder itself has an affinity for water. One way to assess the hydrophilicity of a material is to measure the contact angle of water with a dry film formed from the material. In certain embodiments of the present invention, the binder comprises a material that can form a dry film that exhibits a water contact angle of no more than 20°, or, in other embodiments, no more than 15°, or, in yet other embodiments, no more than 10°.

As a result, in certain embodiments of the present invention, upon application of the liquid composition to a substrate and subsequent drying, the resulting film exhibits an initial water contact angle of no more than 20° or, in some embodiments, no more than 15°, or, in yet other embodiments, no more than 10°, prior to photoexcitation of the photocatalytic material. The water contact angles reported herein are a measure of the angle between a tangent to the drop shape at the contact point and the surface of the substrate as measured through the drop and may be measured by the sessile drop method using a modified captive bubble indicator manufactured by Lord Manufacturing, Inc., equipped with Gaertner Scientific goniometer optics. The surface to be measured is placed in a horizontal position, facing upward, in front of a light source. A sessile drop of water is placed on top of the surface in front of the light source so that the profile of the sessile drop can be viewed and the contact angle measured in degrees through the goniometer telescope which is equipped with circular protractor graduations.

In certain embodiments of the present invention, the liquid composition comprises a binder that exhibits anti-static properties, i.e., the binder can form a dry film that has the ability to dissipate electrostatic charges. As will be appreciated by those skilled in the art, one way to assess the anti-static capability of a material is to measure the surface resistivity of the material. In certain embodiments of the present invention, the binder comprises a material that can form a dry film that exhibits a surface resistivity of from $7.5 \times 10^9$ to $1.5 \times 10^{12}$ ohms/cm², or, in other embodiments, no more than $1.0 \times 10^{10}$ ohms/cm². The surface resistivities reported herein can be determined with an ACL Statitide Model 800 Megohmeter using either (1) large extension probes placed 5 millimeters apart at several locations on the sample, or (2) the meters onboard probes spaced 2¾ inches apart at several locations on the sample. As a result, the present invention is also directed to liquid compositions having such anti-static properties.

The liquid compositions of the present invention comprise a binder that comprises an essentially completely hydrolyzed organosilicate. As used herein, the term "organosilicate" refers to a compound containing organic groups bonded to a silicon atom through an oxygen atom. Suitable organosilicates include, without limitation, organoxysilanes containing four organic groups bonded to a silicon atom through an oxygen atom and organoxysiloxanes having a siloxane main chain ((Si—O)$_n$) constituted by silicon atoms.

The organic groups bonded to the silicon atom through an oxygen atom in the organosilicates are not limited and may include, for example, linear, branched or cyclic alkyl groups. Specific examples of the organic groups that may be bonded to the silicon atom through an oxygen atom in the organosilicates include, without limitation, methyl, ethyl, n-propyl, i-propyl, n-butyl, i-butyl, t-butyl, n-pentyl, i-pentyl, neopentyl, hexyl, octyl or the like. Of these alkyl groups, $C_1$ to $C_4$ alkyl groups are often used. Examples of other suitable organic groups may include aryl, xylyl, naphthyl or the like. The organosilicate may contain two or more different kinds of organic groups.

Specific non-limiting examples of suitable organoxysilanes are tetramethoxysilane, tetraethoxysilane, tetra-n-propoxysilane, tetraisopropoxysilane, tetra-n-butoxysilane, tetraisobutoxysilane, tetra-sec-butoxysilane, tetra-t-butoxysilane, tetraphenoxysilane, and dimethoxydiethoxysilane. These organosilicates may be used alone or in combination of any two or more thereof. Among these organosilicates, tetramethoxysilane and/or partially hydrolyzed condensates thereof show a high reactivity for hydrolysis and, therefore, can readily produce silanol groups.

Specific non-limiting examples of suitable organoxysiloxanes are condensates of the above organoxysilanes. The condensation degree of the organoxysiloxanes is not particularly restricted. In certain embodiments, the condensation degree lies within the range represented by the following formula:

wherein x is from 0 to 1.2, and y is from 1.4 to 4 with the proviso that (2x+y) is 4; and R is an organic group, such as $C_1$ to $C_4$ alkyl.

The factor or subscript x represents the condensation degree of the siloxane. When the siloxane shows a molecular weight distribution, the factor x means an average condensation degree. Compounds represented by the above formula wherein x=0, are organoxysilanes as a monomer, and compounds represented by the above formula wherein 0<x<2, are oligomers corresponding to condensates obtained by partial hydrolysis condensation. Also, compounds represented by the above formula wherein x=2, corresponds to $SiO_2$ (silica). In certain embodiments, the condensation degree x of the organosilicate used in the present invention is in the range of 0 to 1.2, such as 0 to 1.0. The siloxane main chain may have a linear, branched or cyclic structure or a mixture thereof. The above formula: $SiO_x(OR)_y$ may be determined by Si-NMR as described in U.S. Pat. No. 6,599,976 at col. 5, lines 10 to 41, incorporated herein by reference.

As mentioned earlier, the binder of the liquid compositions of the present invention comprises an organosilicate that is essentially completely hydrolyzed. As used herein, the term "essentially completely hydrolyzed organosilicate" refers to a material wherein the organoxy groups of the organosilicate are substantially replaced by silanol groups to an extent that the material is rendered hydrophilic, i.e., the material can form a dry film that exhibits a water contact angle of no more than 20°, or, in other embodiments, no more than 15°, or, in yet other embodiments, no more than 10°. This hydrolysis may produce a network polymer, as illustrated below:

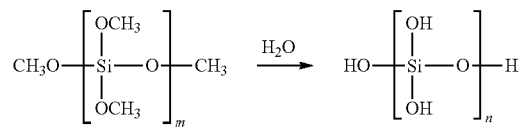

where m and n are positive numbers and m is no more than n. In certain embodiments of the present invention, the essentially completely hydrolyzed organosilicate is substantially free of —OR groups as determined by FTIR or other suitable analytical technique.

Referring now to FIG. 1, there is seen a chart reflecting an FTIR analysis of a dry film formed from such a hydrophilic binder material. As is apparent, significant peaks are observed at the Si—OH bond wavenumber, which is 920-950, ad the Si—O—Si bond wavenumber, which is 1050-1100. On the other hand, it is apparent that the film is substantially free of —OR groups, where R represents $C_1$ to $C_4$ alkyl groups, as evidenced by the absence of any substantial peak at the Si—OR wavenumber, which is 2900-3000.

In certain embodiments, the essentially completely hydrolyzed organosilicate included in the binder of the present invention is the product of the hydrolysis of an organosilicate with a large amount of water in the presence of an acid hydrolysis catalyst. The hydrolysis may be conducted with water present in an amount considerably greater than the stoichiometric amount capable of hydrolyzing organoxy groups of the organosilicate. It is believed that the addition of such an excessive amount of water allows silanol groups produced by hydrolysis of the organosilicate to coexist with a large amount of water, thereby preventing the condensation reaction of the silanol groups.

The hydrolysis of the organosilicate may be conducted in the presence of one or more acid hydrolysis catalysts. Specific examples of suitable catalysts include, without limitation, inorganic acids, such as hydrochloric acid, sulfuric acid, nitric acid and phosphoric acid, among others; organic acids, such as acetic acid, benzenesulfonic acid, toluenesulfonic acid, xylenesulfonic acid, ethylbenzenesulfonic acid, benzoic acid, phthalic acid, maleic acid, formic acid, citric acid, and oxalic acid, among others; alkali catalysts, such as sodium hydroxide, potassium hydroxide, calcium hydroxide, ammonia; and organic amine compounds, or organometallic compounds or metal alkoxide compounds other than the organosilicates, e.g., organotin compounds, such as dibutyl tin dilaurate, dibutyl tin dioctoate and dibutyl tin diacetate, organoaluminum compounds, such as aluminum tris(acetylacetonate, aluminum monoacetylacetonate bis(ethylacetoacetate), aluminum tris(ethylacetoacetate) and ethylacetoacetate aluminum diisopropionate, organotitanium compounds, such as titanium tetrakis(acetylacetonate), titanium bis(butoxy), bis (acetylacetonate) and titanium tetra-n-butoxide, and organozirconium compounds, such as zirconium tetrakis(acetylacetonate), zirconium bis(butoxy)-bis(acetylacetonate), zirconium (isopropoxy)-bis(acetylacetonate) and zirconium tetra-n-butoxide, and boron compounds, such as, boron tri-n-butoxide and boric acid; or the like.

In certain embodiments, the binder may also comprise, in addition to water, an organic solvent, such as alcohols, glycol derivatives, hydrocarbons, esters, ketones, ethers or the like. These solvents may be used alone or in the form of a mixture of any two or more thereof.

Specific examples of alcohols that may be used include, without limitation, methanol, ethanol, n-propanol, isopropanol, n-butanol, isobutanol, acetylacetone alcohol or the like. Specific examples of glycol derivatives that may be used include, without limitation, ethylene glycol, ethylene glycol monomethyl ether, ethylene glycol monoethyl ether, propylene glycol, propylene glycol monomethyl ether, propylene glycol monoethyl ether, diethylene glycol monomethyl ether, diethylene glycol monoethyl ether, ethylene glycol monomethyl ether acetate, ethylene glycol monoethyl ether acetate, propylene glycol monomethyl ether acetate, propylene glycol; monoethyl ether acetate or the like. Specific examples of hydrocarbons that may be used include, without limitation, benzene, toluene, xylene, kerosene, n-hexane or the like. Specific examples of esters that may be used include, without limitation, methyl acetate, ethyl acetate, propyl acetate, butyl acetate, methyl acetoacetate, ethyl acetoacetate, butyl acetoacetate or the like. Specific examples of the ketones that may be used include-acetone, methyl ethyl ketone, methyl isobutyl ketone, acetyl acetone or the like. Specific examples of ethers that may be used include, without limitation, ethyl ether, butyl ether, methoxy ethanol, ethoxy ethanol, dioxane, furan, tetrahydrofuran or the like.

Binders suitable for use in the present invention and methods for their production are described in U.S. Pat. No. 6,599,976 at col. 3, line 57 to col. 10, line 58, incorporated herein by reference. Non-limiting examples of commercially available materials that are essentially completely hydrolyzed organosilicates, and which are suitable for use in the binder in the compositions of the present invention are MSH-200, MSH-400, and MSH-500, silicates available from Mitsubishi Chemical Corporation, Tokyo, Japan and Shinsui Flow MS-1200, available from Dainippon Shikizai, Tokyo, Japan.

In certain embodiments, the binder is prepared in a multi-stage process wherein, in a first stage, an organoxysilane, such as any of those mentioned earlier, is reacted with water in the presence of an acid hydrolysis catalyst, such as any of those mentioned earlier, wherein the water is present in an amount that is less than the stoichiometric amount capable of hydrolyzing the organoxy groups of the organoxysilane. In certain embodiments, the acid hydrolysis catalyst comprises an organic acid. In certain embodiments, the water is present during the first stage in a stoichiometric amount capable of hydrolyzing 50 percent of the organoxy groups of the organoxysilane. The result of the first stage is a partial hydrolysis polycondensation reaction product.

In certain embodiments, the first stage of the multi-stage binder preparation process is conducted at conditions that limit the degree of condensation of Si—OH groups formed as a result of the hydrolysis reaction. Such conditions can include, for example, controlling the reaction exotherm by, for example, external cooling, controlling the rate of addition of the acid catalyst, and/or conducting the first stage hydrolysis in the substantial absence (or complete absence) of any organic cosolvent.

In a second stage, the partial hydrolysis polycondensation reaction product is then contacted with a large amount of water, often in the absence of an acid hydrolysis catalyst. The amount of water used in the second stage is considerably greater (by "considerably greater" it is meant that the resulting solution contains no more than 2% solids) than the stoichiometric amount capable of hydrolyzing organoxy groups of the organoxysilane.

In yet other embodiments, the binder is prepared by starting with a tetraalkoxysilane oligomer, such as those commercially available from Mitsubishi Chemical Corp. under the tradenames MKC Silicate MS-51, MKC Silicate MS-56 and MKC Silicate MS-60 (all trademarks; products of Mitsubishi Chemical Corp.). Such an oligomer is reacted with water in the presence of an organic acid hydrolysis catalyst (such as, for example, acetic acid) and/or an organic solvent, wherein the water is present in an amount that is considerably greater than the stoichiometric amount capable of hydrolyzing organoxy groups of the tetralkoxysilane.

As a result, the present invention is also directed to methods for making hydrophilic compositions comprising an essentially completely hydrolyzed organosilicate. The Examples herein describe exemplary conditions for such methods.

In certain embodiments of the present invention, the amount of organosilicate that is present in the liquid composition ranges from 0.1 to 2 percent by weight calculated as $SiO_2$ in the organosilicate, such as 0.2 to 0.9 percent by weight based on the total weight of the composition. In these embodiments, the amount of the organosilicate that may be present in the liquid composition can range between any combination of the recited values, inclusive of the recited values. It will be understood by those skilled in the art that the amount of the organosilicate present in the liquid composition is determined by the properties desired to be incorporated into the composition.

In certain embodiments of the present invention, the photocatalytic material and the organosilicate are present in the liquid composition at a ratio of 0.05:0.95 to 5:0.3 by weight, or, in other embodiments 0.10:0.90 to 3.0:0.5 by weight, or, in yet other embodiments, at least 0.3:0.5 by weight, or 0.2:0.6 by weight. In these embodiments, the ratio of the photocatalytic material to the organosilicate can range between any combination of the recited values, inclusive of the recited values. It will be understood by those skilled in the art that the ratio of photocatalytic material and organosilicate in the liquid composition is determined by the properties desired to be incorporated into the composition, such as the refractive index desired for the composition which may be determined with reference to the substrate upon which the composition is to be applied.

In certain embodiments, the liquid compositions of the present invention can further include inorganic particles, for example, silica, alumina, including treated alumina (e.g. silica-treated alumina known as alpha aluminum oxide), silicon carbide, diamond dust, cubic boron-nitride, and boron carbide. Such inorganic particles may, for example, be substantially colorless, such as silica, for example, colloidal silica. Such materials may provide enhanced mar and scratch resistance. Such particles can have an average particle size ranging from sub-micron size (e.g. nanosized particles) up to 10 microns depending upon the end use application of the composition and the desired effect.

In certain embodiments, the particles comprise inorganic particles that have an average particle size ranging from 1 to 10 microns, or from 1 to 5 microns prior to incorporation into the liquid composition. In other embodiments, the particles may have an average particle size ranging from 1 to less than 1000 nanometers, such as 1 to 100 nanometers, or, in certain embodiments, 5 to 50 nanometers, prior to incorporation into the liquid composition. In some embodiments, the inorganic particles have an average particle size ranging from 5 to 50, or 5 to 25 nanometers prior to incorporation into the liquid composition. The particle size may range between any combination of these values inclusive of the recited values.

In certain embodiments of the present invention, the particles can be present in the liquid composition in an amount ranging from up to 5.0 percent by weight, or from 0.1 to 1.0 weight percent; or from 0.1 to 0.5 weight percent based on total weight of the composition. The amount of particles present in the liquid composition can range between any combination of these values inclusive of the recited values.

In certain embodiments of the present invention the liquid composition also comprises an antimicrobial enhancing material, such as, for example, metals; such as silver, copper, gold, zinc, a compound thereof, or a mixture thereof; quaternary ammonium compounds, such as benzalkonium chlorides, dialkyldimethyl-ammonium chlorides, cetyltrimethyl-ammonium bromide, cetylpyridinium chloride, and 3-(trimethoxysilyl)-propyldimethyl-octadecyl-ammonium chloride; phenolics, such as 2-benzyl-4-chlorophenol, o-phenylphenol, sodium o-phenylphenate, pentachlorophenol, 2(2',4'-dichlorophenoxy)-5-chlorophenol, and 4-chloro-3-methylphenol; halogen compounds, such as trichloroisocyanurate, sodium dichloroisocyanurate, potassium dichloroisocyanurate, monotrichloroisocyanurate, potassium dichloroisocyanurate, 1:4 dichlorodimethylhydantoin, bromochlorodimethylhydantoin, 2,2'-dibromo-3-nitrilopropionamide, bis(1,4-bromoacetoxy)-2-butene, 1,2-dibromo-2,4-dicyanobutane, 2-bromo-2-nitropropane-1,3-diol, and benzyl bromoacetate; organometallics, such as 10,10'-oxybisphenoxiarsine, tributyltin oxide, tributyltin fluoride, copper 8-quinolinolate, copper naphthenate, chromated copper arsenate, ammoniacal copper arsenate, and cuprous oxide; organosulfur compounds, such as methylenebisthiocyanate (MBT), vinylenebisthiocyanate, chloroethylenebisthiio-cyanate, sodium dimethyldithiocarbamate, disodium ethylenebisdithiocarbamate, zinc dimethyldithiocarbamate, and bis(trichloromethyl) sulfone; heterocyclics, such as tetrahydro-3,5-dimethyl-2H-1,3,5-thiadiazine-2-thione (DMTT), sodium pyridinethione, zinc pyridinethione, 1,2-benzisothiazoline-3-one, 2-(n-octyl)-4-isothiazolin-3-one, 2-(4-thiazolyl)benzimidazole, N-(trichloromethylthio)-4-cyclohexene-1,2-dicarboximide, N-(trichloromethylthio)-phthalimide, and 5-chloro-2-methyl-4-isothiazolin-3-one 2-methyl-4-isothiazolin-3-one; and nitrogen compounds, such as N-cocotrimethylenediamine, N-[α-(1-nitroethyl) benzyl]-ethylenediamine, 2-(hydroxymethyl)amino-ethanol, 2-(hydroxymethyl)amino-2-methylpropanol, 2-hydroxymethyl-2-nitro-1,3-propanediol, hexahydro-1,3,5-tris-(2-hydroxyethyl)-s-triazine, hexahydro-1,3,5-triethyl-s-triazine, 4-(2-nitrobutyl)morpholine+4,4'-(2-ethyl-2-nitro-trimethylene)-dimorpholine, glutaraldehyde, 1,3-dimethylol-5,5-dimethyl-hydantoin, and imidazolidinyl urea, and mixtures thereof.

The liquid compositions of the present invention may, for example, contain a quantity of antimicrobial agent sufficient to exhibit an efficacy against microbes and particularly various species of fungi. More specifically, embodiments of the present invention may contain a quantity of antimicrobial agent sufficient to inhibit microbial growth on a substrate tested in accordance with MTCC (American Association of Chemists & Colorists) Test Method 30, Part III. Those skilled in the art are familiar with this test method and its parameters. In certain embodiments of the present invention, the amount of antibacterial enhancing material that is present in the liquid composition ranges from 0.01 to 1.0 percent by weight, such as 0.1 to 1.0 percent by weight, or, in other embodiments, 0.1 to 0.5 percent by weight based on the total weight of the composition. In these embodiments, the amount of the antibacterial enhancing material that may be present in the liquid composition can range between any combination of the recited values, inclusive of the recited values. It will be understood by those skilled in the art that the amount of the antibacterial enhancing material present in the liquid composition is determined by the properties desired to be incorporated into the composition.

In certain embodiments, the liquid compositions of the present invention may comprise an optical activity enhancer, such as platinum, gold, palladium, iron, nickel, or soluble salts thereof. The addition of these materials to compositions comprising a photocatalytic material is known to enhance the redox activity of the photocatalyst, promoting, decomposition of contaminants adhering to the coating surface. In certain embodiments of the present invention, the amount of optical activity enhancer present in the liquid composition ranges from 0.01 to 1.0 percent by weight, such as 0.1 to 1.0 percent by weight, or, in other embodiments, 0.1 to 0.5 percent by weight based on the total weight of the composition. In these embodiments, the amount of optical activity enhancer that may be, present in the liquid composition can range between any combination of the recited values, inclusive of the recited values. It will be understood by those skilled in the art that the amount of the optical activity enhancer present in the liquid composition is determined by the properties desired to be incorporated into the composition.

In certain embodiments, the liquid compositions of the present invention may comprise a coupling agent, which may, for example, improve the adhesion of the compositions of the present invention to painted substrates. Examples of coupling agents suitable for use in the liquid compositions of the present invention include, without limitation, the materials described in U.S. Pat. No. 6,165,256 at col. 8, line 27 to col. 9, line 8, incorporated herein by reference.

In certain embodiments of the present invention, the amount of coupling agent that is present in the liquid composition ranges from 0.01 to 1 percent by weight, such as, 0.1 to 0.5 percent by weight based on the total weight of the composition. In these embodiments, the amount of coupling agent that may be present in the liquid composition can range between any combination of the recited values, inclusive of the recited values. It will be understood by those skilled in the art that the amount of coupling agent present in the liquid composition is determined by the properties desired to be incorporated into the composition.

In certain embodiments, the liquid compositions of the present invention may comprise a surface active agent, which may, for example, aid in improving the wetting properties of the composition, particularly when the composition is applied over a coated substrate, such as a substrate coated with an organic coating. Examples of surface active agents suitable for use in the present invention include, without limitation, the materials identified in U.S. Pat. No. 6,610,777 at col. 37, line 22 to col. 38, line 60 and U.S. Pat. No. 6,657,001 at col. 38, line 46 to col. 40, line 39, which are both incorporated herein by, reference.

In certain embodiments of the present invention, the amount of surfactant that is present in the liquid composition ranges from 0.01 to 3 percent by weight, such as 0.01 to 2 percent by weight, or, in other embodiments, 0.1 to 1 percent by weight based on the total weight of solids in the composition. In these embodiments, the amount of surfactant that may be present in the liquid composition can range between any combination of the recited values, inclusive of the recited values. It will be understood by those skilled in the art that the amount of surfactant present in the liquid composition is determined by the properties desired to be incorporated into the composition.

In certain embodiments, the liquid compositions of the present invention may comprise a cleaning composition. Suitable cleaning compositions includes those materials that comprise a surfactant, a solvent system, water, and a pH adjusting agent, such as acetic acid or ammonia. A suitable cleaning composition is disclosed in U.S. Pat. No. 3,463,735, which discloses a cleaning composition comprising a solvent system comprising a low boiling solvent, such as isopropanol, and a moderately high boiling solvent, such as a $C_1$ to $C_4$ alkylene glycol alkyl ether having a total of 3 to 8 carbon atoms. Suitable commercially available cleaning compositions include WINDEX®, commercially available from SC Johnson and Son, Inc. The inventors have discovered that the inclusion of a cleaning composition to certain embodiments of the present invention can improve the wetting properties of the present compositions when applied to painted surfaces, such as aluminum-clad window sashes, aluminum siding, and the like. As a result, in certain embodiments, the painted surface need not be cleaned prior to application of the liquid compositions of the present invention.

Certain embodiments of the present invention, therefore, are directed to liquid compositions comprising (a) a cleaning composition, and (b) an essentially completely hydrolyzed organosilicate. Such compositions may also include a photocatalytic material, as described earlier.

In certain embodiments, the cleaning composition is present in the liquid compositions of the present invention in an amount of at least 10 weight percent, such as at least 20 weight percent, or, in some cases at least 25 weight percent, with weight percent being based on the total weight of the liquid composition.

If desired, the coating composition can comprise other optional coating materials well known to those skilled in the coatings art.

The present invention is also directed to methods of making liquid compositions. According to certain methods of the present invention, a liquid composition is prepared by (a) providing a hydrophilic material comprising an essentially completely hydrolyzed organosilicate, wherein the pH of the hydrophilic material is no more than 3.5; (b) providing a sol or paste comprising a photocatalytic material dispersed in a diluent, wherein the pH of the sol is no more than 3.5; and (c) mixing the hydrophilic material provided in (a) with the sol or paste provided in (b) to, disperse the photocatalytic material in the hydrophilic material. It has been found that liquid compositions made by this method can be stable for over 12 months with little or no agglomeration or precipitation. The pH values reported herein can be determined using an ACCU-MET pH meter commercially available from Fisher Scientific.

Certain methods of the present invention comprise the step of providing a hydrophilic material comprising an essentially completely hydrolyzed organosilicate, wherein the pH of the hydrophilic material is no more than 3.5 or, in some embodiments, from 1.3 to 3.5 or, in yet other embodiments 3.0 to 3.5.

In certain embodiments of the methods of the present invention, such a hydrophilic material is obtained by first providing a material comprising an essentially completely hydrolyzed organosilicate wherein the pH of the material is greater than the desired pH and then adding, acid to the material until the pH of the material is no more than 3.5 or, in some embodiments from 1.3 to 3.5 or, in yet other embodiments, 3.0 to 3.5. For example, as mentioned earlier, the hydrophilic material may comprise the MSH-200 and/or MS-1200 silicates, both of which are typically provided by the supplier at a pH of 3.5 to 4.5.

In certain embodiments of the methods of the present invention, the hydrophilic material may be diluted with a diluent, such as water or an organic solvent, before the addition of acid to, for example, reduce the solids content of the hydrophilic material, thereby allowing for the formation of thinner films, as described below.

Acids that may be added to the hydrophilic material to adjust the pH thereof include both inorganic and organic acids. Suitable inorganic acids include, without limitation, hydrochloric acid, sulfuric acid, nitric acid and phosphoric acid, among others. Suitable organic acids include acetic acid, dichloroacetic acid, trifluoroacetic acid, benzenesulfonic acid, toluenesulfonic acid, xylenesulfonic acid, ethylbenzenesulfonic acid, benzoic acid, phthalic acid, maleic acid, formic acid and oxalic acid, among others.

Certain methods of the present invention comprise the step of providing a sol or paste comprising a photocatalytic material dispersed in a diluent, wherein the pH of the sol or paste is no more than 3.5 or, in some embodiments, from 1.3 to 3.5 or, in yet other embodiments 3.0 to 3.5. In certain embodiments, the pH of the sol or paste is substantially the same as that of the hydrophilic material provided in step (a) of the invention. In certain embodiments of the methods of the present invention, such a sol or paste is obtained by first providing such a sol or paste wherein the pH thereof is greater than the desired pH and then adding acid to the sol or paste until the pH of the sol or paste is no more than 3.5 or, in some embodiments from 1.3 to 3.5 or, in yet other embodiments, 3.0 to 3.5. For example, as mentioned earlier, the photocatalytic material used in the compositions of the present invention may comprise a sol of titanium oxide available from Showa Denko Corporation under the names NTB-1 and NTB-13, wherein the so comprises brookite-type titanium oxide particles or a mixture of brookite-type with anatase-type and/or rutile-type titanium oxide particles dispersed in water. NTB-1 and NTB-13 are typically provided by the supplier at a pH of 2 to 4.

Acids that may be added to the sol or paste comprising the photocatalytic material to adjust the pH, thereof include both the inorganic and organic acids described earlier, among others. In certain embodiments of the present invention, the acid that is added to the sol or paste comprising the photocatalytic material is the same acid that is added to the hydrophilic material provided in step (a) of the invention.

The methods of the present invention comprise the step of mixing the hydrophilic material, provided in step (a) with the sol or paste provided in step (b) to disperse the photocatalytic material in the hydrophilic material. The mixing step is not particularly limited and may be accomplished by any conventional mixing technique known to those of skill in the art, so long as the mixing results in a dispersion of the photocatalytic material in the hydrophilic material. As a result, the present invention is also directed to the liquid compositions described above, wherein the pH of the composition is no more than 3, such as 1.3 to 3.5, or, in some embodiments, 3.0 to 3.5.

According to certain other methods of the present invention, a liquid composition is prepared by (a) providing a hydrophilic material comprising an essentially completely hydrolyzed organosilicate, wherein the pH of the hydrophilic material is from 7.0 to 8.5; (b) providing a sol or paste comprising a photocatalytic material dispersed in a diluent, wherein the pH of the sol or paste is from 7.0 to 8.5; and (c) mixing the hydrophilic material provided in (a) with the sol or paste provided in (b) to disperse the photocatalytic material in the hydrophilic material.

These methods of the present invention comprise the step of providing a hydrophilic material comprising an essentially completely hydrolyzed organosilicate, wherein the pH of the hydrophilic material is from 7.0 to 8.5, such as 7.0 to 8.0 or, in some embodiments, 7.5 to 8.0. In certain embodiments of these methods of the present invention, such a hydrophilic material is obtained by first providing a material comprising an essentially completely hydrolyzed organosilicate wherein the pH of the material is less than the desired pH and then adding a base compound to the material until the pH of the material is from 7.0 to 8.5, such as 7.0 to 8.0 or, in some cases, 7.5 to 8.0.

In certain embodiments of these methods of the present invention, the hydrophilic material may be diluted with water prior to addition of the a base compound as described earlier.

Materials that may be added to the hydrophilic material to adjust the pH thereof include both organic bases and inorganic bases. Specific examples of bases which may be used to raise the pH of the hydrophilic material include, without limitation, alkali metal hydroxides, such as sodium hydroxide, potassium hydroxide and lithium hydroxide; ammonium hydroxide; quaternary ammonium hydroxides, such as tetraethyl ammonium hydroxide and tetraethanol ammonium hydroxide; amines such as, triethylamine and 3-(diethylamino)-propan-1-ol; tertiary sulfonium hydroxides, such as trimethyl sulfonium hydroxide and triethyl sulfonium hydroxide; quaternary phosphonium hydroxides, such as tetramethyl phosphonium hydroxide and tetraethyl phosphonium hydroxide; organosilanolates, such as tripotassium γ-aminopropylsilantriolate, tripotassium N-(β-aminoethyl)-γ-aminopropylsilantriolate, dipotassium dimethylsilandiolate, potassium trimethylsilanolate, bis-tetramethylammonium dimethylsilandiolate, bis-tetraethylammonium dimethylsilandiolate, and tetraethylammonium trimethylsilanolate; sodium acetate; sodium silicate; ammonium bicarbonate; and mixtures thereof.

These methods of the present invention comprise the step of providing a sol or paste comprising a photocatalytic material dispersed in a diluent, wherein the pH of the sol or paste is from 7.0 to 8.5, such as 7.0 to 8.0 or, in some embodiments, from 7.5 to 8.0. In certain embodiments, the pH of the sol or paste is substantially the same as that of the hydrophilic material (a). In certain embodiments of these methods of the present invention, such a sol or paste is obtained by first providing such a sol or paste wherein the pH thereof is less than the desired pH and then adding a base to the sol or paste until, the pH thereof is from 7.0 to 8.5, such as 7.0 to 8.0 or, in some embodiments from 7.5 to 8.0.

Bases that may be added to the sol or paste comprising the photocatalytic material to adjust the pH thereof include the inorganic and organic bases described earlier, among others. In certain embodiments of the present invention, the base that is added to the sol or paste comprising the photocatalytic material is the same as that added to the hydrophilic material provided in step (a) of the invention.

These methods of the present invention further comprise the step of mixing the hydrophilic material provided in step (a) with the sol or paste provided in step (b) to disperse the photocatalytic material in the hydrophilic material. The mixing step is not particularly limited and may be accomplished by any conventional mixing technique known to those of skill in the art, so long as the mixing results in a dispersion of the photocatalytic material in the hydrophilic material. It has been found that liquid compositions made by this method are stable for 24 to 72 hours with only a small amount of precipitation. As a result, the present invention is also directed to the liquid compositions described above, wherein the pH of the composition is from 7.0 to 8.5, such as 7.0 to 8.0, or, in some cases, 7.5 to 8.0.

Figure 2:
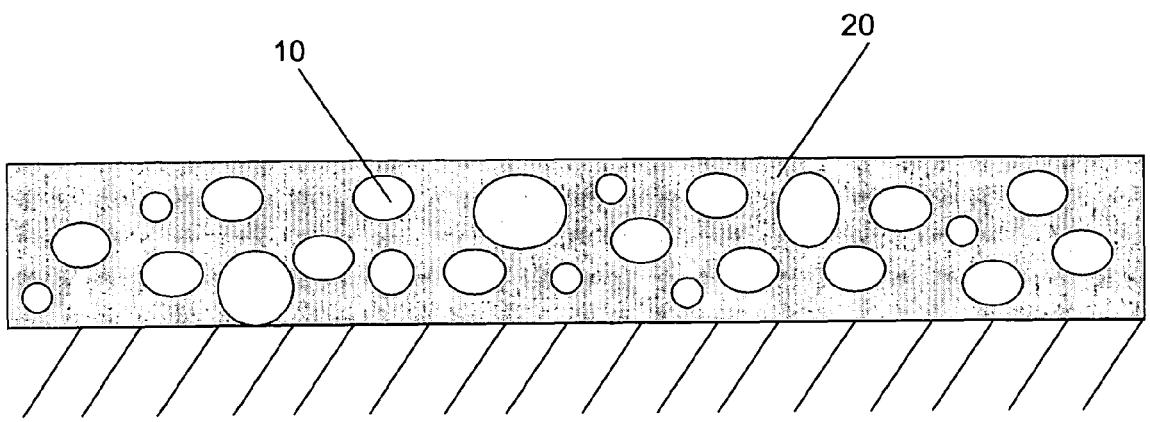
FIG. 2 is a schematic cross-sectional view in an enlarged scale of certain non-limiting embodiments of the present invention.
Figure 3:
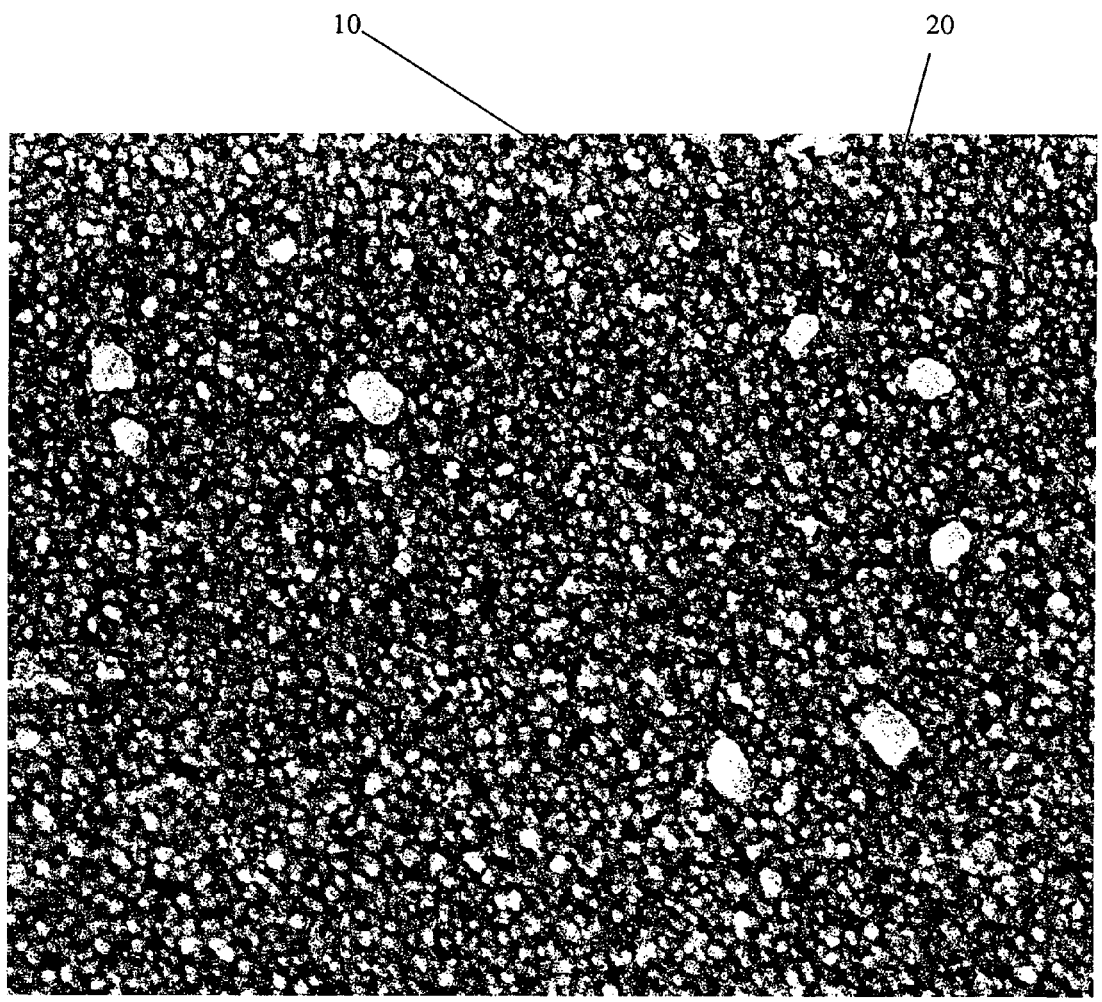
FIG. 3 is a Field Emission Scanning Electron Microscope Secondary Electron Micrograph (magnification 40,000×) depicting certain non-limiting embodiments of the present invention.

Referring now to FIGS. 2 and 3 there is seen (i) a schematic cross-sectional view in an enlarged scale of certain non limiting embodiments of the present invention, and (ii) a micrograph illustrating an embodiment of the present invention, respectively. As is apparent from FIGS. 2 and 3, in certain embodiments of the present invention, coatings are formed wherein the photocatalytic material is dispersed throughout the hydrophilic binder. In these embodiments, the coatings comprise a photocatalytic material in the form of nano-sized photocatalytic particles 10 (in these particular examples, the particles have an average crystalline diameter no more than 20 nanometers), which are relatively uniformly dispersed throughout the hydrophilic binder 20. In particular, it is apparent, particular from FIG. 3, that the particles 10 are non-agglomerated, i.e., all or nearly all of the particles are encapsulated by, and separated by, the binder rather than being combined to each other. While not being limited by any theory, it is believed that, by controlling the pH of the hydrophilic material and the sol or paste of photocatalytic material, prior to their combination, the photocatalytic particles can be well dispersed in the hydrophilic material, such that agglomeration is prevented, which results in a liquid composition of low turbidity. Thus, the present invention is also directed to liquid compositions having low turbidity as described below.

Because the photocatalytic particles are prevented from agglomerating in certain compositions of the present invention, the compositions can be applied directly over an organic film while resulting in little, if any, direct contact between the photocatalytic material, such as titanium dioxide particles, and the organic film. As a result, one advantage of embodiments of the present invention is that the liquid compositions can be applied directly to an organic film without the need for any barrier layer between the compositions of the present invention and the organic film. As will be appreciated by those skilled in the art, the —OH free radical that is generated by the photocatalytic action of a photocatalytic material, such as titanium dioxide, will otherwise degrade an organic film that is in direct contact with the photocatalytic material.

One advantage of the liquid compositions of the present invention and/or the methods of producing liquid compositions of the present invention is that they may result in stable one-package liquid compositions. Therefore, the present invention is also directed to one-pack liquid compositions. As used herein, the term "one-pack liquid composition" refers to a liquid composition wherein the components comprising the liquid composition are stored together in a single container.

The one-pack liquid compositions of the present invention comprise at least two components, including the previously discussed photocatalytic materials and hydrophilic binders. In addition, the one-pack liquid compositions of the present invention have a shelf-life of at least 3 months. As used herein, the term "shelf-life" refers to the amount of time between when the components are combined in a single container and the occurrence of precipitation or agglomeration to an extent that the turbidity of the liquid composition increases such that the composition can no longer form a low haze film. According to certain embodiments of the present invention, the stable one-pack liquid compositions have a shelf-life of at least 3 months or, in certain other embodiments, at least 6 months, or, in other embodiments, at least 12 months.

In certain embodiments, the liquid compositions of the present invention have a turbidity of no more than 600 NTU; or, in some cases, no more than 400 NTU (Nephelometric Turbidity Units) after 3 months, 6 months, or; in some cases, 12 months. The turbidity values reported herein can be determined by a Turbidimeter, Model DRT-100D, manufactured by Shaban Manufacturing Inc, H. F. Instruments Division using a sample cuvette of 28 mm diameter by 91 mm in length with a flat bottom. Moreover, coating films deposited from compositions of the present invention, in certain embodiments, have low haze. As used herein, "low haze" means that the film has a haze of no more than 0.3%. The haze values reported herein can be determined with a haze meter, such as a Hazegard® Model No. XL-211, available from Pacific Scientific Company, Silver Spring, Md.

The liquid compositions of the present invention may also be present in the form of a multi-pack product. Therefore, the present invention is also directed to multi-pack products comprising a first component comprising the previously discussed photocatalytic materials and a second component comprising the previously discussed hydrophilic binder. As used herein, the term "multi-pack product" refers to a coating product comprising more than one component wherein the components are combined just prior to application to a substrate.

The present invention is also directed to methods of coating a substrate with a liquid composition. These methods of the present invention comprise the steps of (a) applying to a substrate a liquid composition, and (b) curing the composition. The substrate may be cleaned with, for example, an alcohol/water mixture, and dried prior to step (a). The liquid compositions used in these methods of the present invention comprise the previously discussed photocatalytic materials and hydrophilic binders.

In these methods of the present invention, the liquid composition may be applied to the substrate by any desired technique, such as, for example, spray coating, roll coating, dipping, spin coating, flow coating brushing, and wiping. The liquid compositions of the present invention may be applied to polymeric, ceramic, concrete, cement, glass, wood, paper or metal substrates, composite materials thereof, or other materials, including painted substrates. As suggested previously, the liquid compositions of the present invention may be effectively applied directly on organic films that may exist on a surface of such substrates. Multiple layers of the compositions of the present invention can be applied if desired. Substrates that are reactive with silanol groups may "anchor" the compositions of the present invention thereby providing improved adhesion.

Specific examples of articles upon which the liquid compositions of the present invention may be applied include, without limitation, windows; windshields on automobiles, aircraft, watercraft and the like; indoor and outdoor mirrors; lenses, eyeglasses or other optical instruments; protective sports goggles; masks; helmet shields; glass slides of frozen food display containers glass covers; buildings walls; building roofs; exterior tiles on buildings; building stone; painted steel plates; aluminum panels; window sashes; screen doors; gate doors; sun parlors; handrails; greenhouses; traffic signs; transparent soundproof walls; signboards; billboards; guardrails; road reflectors; decorative panels; solar cells; painted surfaces on automobiles watercraft, aircraft, and the like; painted surfaces; on lamps, fixtures, and other articles; air handling systems and purifiers; kitchen and bathroom interior furnishings and appliances; ceramic tiles; air filtration units; store showcases; computer displays; air conditioner heat exchangers, high-voltage cables; exterior and interior members of buildings; window panes; dinnerware; walls in living spaces, bathrooms, kitchens, hospital rooms, factory spaces, office spaces, and the like sanitary ware, such as basins, bathtubs, closet bowls, urinals, sinks, and the like; and electronic equipment, such as computer displays.

The liquid compositions of the present invention may be applied to a substrate by, for example, impregnating a paper, cloth, or non-woven fabric with a liquid composition of the present invention. The impregnated material, may be stored in a container and removed when needed to wipe-coat a surface of a substrate. Alternatively, a paper, cloth, or non-woven fabric could be impregnated with a liquid composition of the present invention at the time of use.

In the methods of coating a substrate of the present invention, the liquid composition is cured, i.e., dried, after it is applied to the substrate. Though not being bound by any theory, it is believed that, upon cure, some of the silanol groups of the essentially completely hydrolyzed binder are condensed so that Si—O—Ti bonds are formed within the dried film formed from the liquid composition. It is believed that the presence of these groups enhances the durability of coatings formed from the compositions of the present invention, as described in more detail below.

The liquid compositions may be self-curing, such that the compositions may cure without the aid of any cure catalyst. Moreover, the liquid compositions of the present invention may, for example, be cured at ambient temperatures. In other words, curing of the liquid compositions of the present invention may be accomplished by allowing the composition to stand in air, i.e., air drying. According to certain embodiments of the present invention, the liquid composition is cured by exposing it to air for 2 to 3 hours at 25° C. to achieve superhydrophilicity and 16 hours to achieve long-term durability. The liquid compositions of the present invention may also be cured by heat drying. For, example, according to certain embodiments of the present invention, the liquid composition is cured by exposing it to air for 3 to 5 minutes and then force drying it at 80° C. to 100° C. for at least 3 seconds.

One of the features of certain embodiments of the present invention is that the liquid composition can have a very low solids content, approximately 1 percent by weight total solids based on the total weight of the composition. Consequently, the liquid composition can be applied to a substrate at extremely small film thicknesses. In particular, according to certain embodiments of the present invention, the composition is applied to a substrate in the form of a thin film that has a dry film thickness of no more than 200 nanometers (0.2 micrometers) or, in some embodiments, 10 to 100 nanometers (0.01 to 0.1 micrometers), in yet other embodiments of the present invention, 20 to 60 nanometers (0.02 to 0.06 micrometers). Application of the compositions of the present invention at such low film thickness can be particular advantageous in providing an optical thin film without necessarily matching the refractive index of the coating to that of the substrate.

As mentioned previously, coatings formed from the liquid compositions of the present invention are initially hydrophilic, that is, upon application, and prior to excitation of the photocatalyst, the coating exhibits an affinity to water. This initial hydrophilicity results from the hydrophilicity of the binder and can be illustrated by an initial water contact angle of no more than 20° or, in some embodiments, no more than 15°, or, in yet other embodiments, no more than 10°. Upon excitation of the photocatalytic material, however, the coatings formed from the liquid compositions of the present invention can be rendered "super-hydrophilic," that is, following excitation of the photocatalyst, such coatings can exhibit a water contact angle of less than 5°, even as little as 0°.

The means that may be used for exciting the photocatalyst depends on the photocatalytic material used in the liquid compositions of the present invention. For example, materials that are photoexcited upon exposure to visible light, such as the brookite form of titanium dioxide, as well as nitrogen or carbon doped titanium dioxide, may be exposed to any visible light source including any radiation of a wavelength of at least 400 nanometers. On the other hand, the anatase and rutile forms of titanium dioxide, tin oxide, and zinc oxide can be photoexcited by exposure UV radiation of a wavelength of less than 387 nanometers, 413 nanometers, 344 nanometers, and 387 nanometers, respectively. Suitable UV radiation sources for photoexciting such photocatalysts include, without limitation, a UV lamp, such as that sold under the tradename UVA-340 by the Q-Panel Company of Cleveland, Ohio, having an intensity of 28 watts per square meter ($W/m^2$) at the coating surface.

In certain embodiments, coatings made from the liquid compositions of the present invention exhibit a photoactivity of at least 0.5 $cm^{-1}$ $min^{-1}$ such as at least 1.0 $cm^{-1}$ $min^{-1}$. Photoactivity can be evaluated as described in U.S. Pat. No. 6,027,766 at col. 11, line 1 to col. 12, line 55, which is incorporated herein by reference.

In certain embodiments, coatings formed from the liquid compositions of the present invention can be rendered superhydrophilic upon exposure to sunlight for a period of 1 to 2 hours. Alternatively, coatings formed from the liquid compositions of the present invention may be rendered superhydrophilic upon exposure to UV radiation of an intensity of 28 $W/m^2$ for 1 hour.

As discussed previously, coatings formed from the liquid compositions of the present invention can exhibit very favorable hydrophilic, anti-static and/or anti-bacterial properties, among others. Because they are hydrophilic, and rendered superhydrophilic upon photoexcitation of the photocatalytic material, coatings made from the compositions of the present invention may exhibit advantageous self-cleaning, anti-fouling, and/or anti-fogging properties. The present invention, therefore, is also directed to methods of rendering a surface of a substrate self-cleaning, anti-fouling, and/or anti-fogging.

Another feature of coatings made from the compositions of the present invention is that they may be particularly durable. The surprising durability of coatings made from the compositions of the present invention can be measured in terms of the ability of the film surface to maintain a contact angle over time under accelerated weather conditions. The lower the degree of contact angle that can be maintained by the sample tested over time or number of wiping cycles, the more durable the film. Simulating weathering of the film can be obtained via weathering chambers, which include the Cleveland Condensing Cabinet (CCC) and QUV Tester (products of The Q-Panel Company, Cleveland, Ohio).

Figure 4:
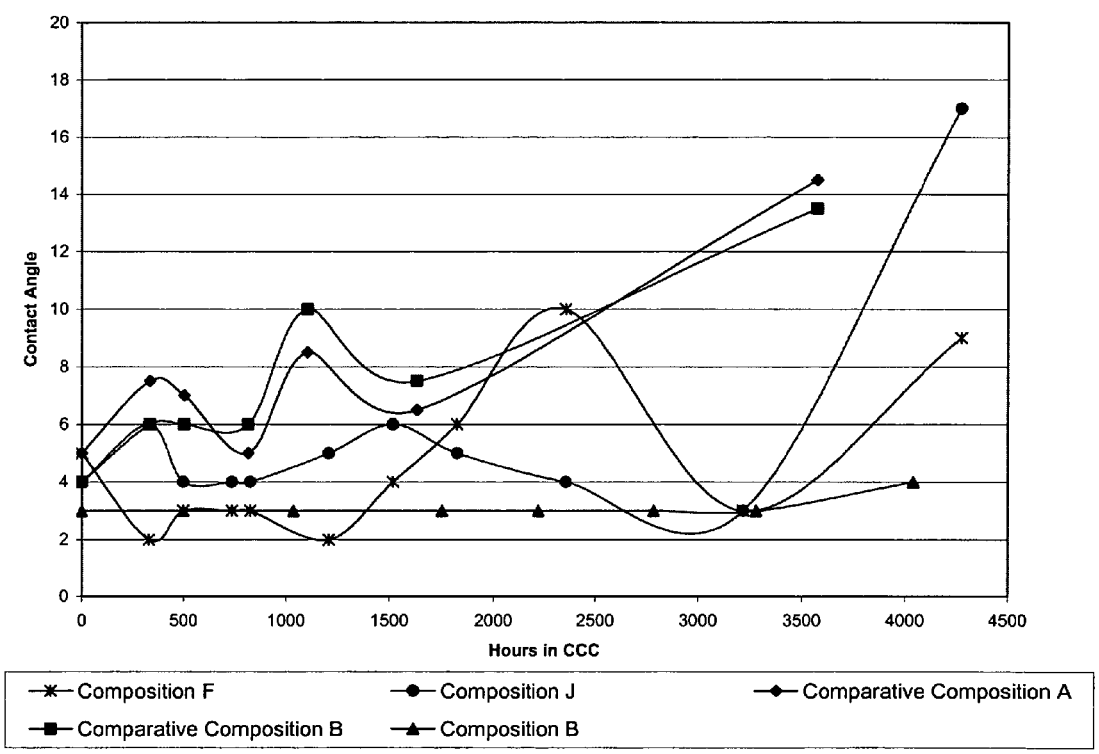
FIG. 4 is a chart illustrating the results of the durability testing conducted as described in Example 2.

In certain embodiments, the photocatalytic material is present in the liquid compositions of the present invention in an amount sufficient to produce a coating that maintains a contact angle of less than 10 degrees, such as less than 5 degrees and/or a phtoactivity of 3 $cm^{-1}$ $min^{-1}$ after exposure to a CCC chamber for 4000 hours, where the CCC chamber is operated at a vapor temperature of 140° F. (60° C.) in an indoor ambient environment which results in constant water condensation on the test surface. Indeed, as illustrated by the Examples herein, it was discovered that the inclusion of a photocatalytic material in certain embodiments of the compositions of the present invention produced coatings exhibiting dramatically improved durability as compared to compositions containing a hydrophilic binder of the type described herein but no photocatalytic material. As illustrated by FIG. 4, in certain embodiments of the present invention, the photocatalytic material can be included in the composition in an amount sufficient to yield a coating that maintains its initial water contact angle (i.e., the water contact angle is within 4 degrees of the initial water contact angle, wherein "initial water contact angle" refers to the water contact angle observed after exposure to UV light for 2 hours as described in the Examples but before exposure to the CCC chamber) even after exposure of the coating to a CCC chamber for 4000 hours as described above, whereas the absence of a photocatalytic material yielded a coating that could not maintain its initial water contact angle after approximately 2000 to 3000 hours of such exposure. Indeed, the Examples illustrate that in the absence of a photocatalytic material the contact angle of the surface increased to nearly three times the initial contact angle after exposure in a CCC for 3500 hours. Without being bound by any, theory, the inventors believe that this surprising result can be attributed to a partial crosslinking of the photocatalytic material with the organosilicate which, yields Si—O—Ti bonds in the coating. The inventors believe that some photocatalytic material takes part in such crosslinking, while some photocatalytic material remains available for photocatalytic activation even after 4000 hours of CCC exposure.

In certain embodiments, coatings made from compositions of the present invention may maintain a contact angle of 5 to 6 degrees after exposure to 650 hours in a Q-UV Tester equipped with fluorescent tubes (B313 nanometers) at black panel temperature of 65° to 70° C. and 4 hours condensing humidity at 50° C. atmosphere temperature.

Illustrating the invention are the following examples, which, however, are not to be considered as limiting the invention to their details. Unless otherwise indicated, all parts and percentages in the following examples, as well as throughout the specification, are by weight.

EXAMPLES

Example 1

Preparation of a Hydrolyzed Organosilicate Binder

An acid hydrolysis catalyst solution, referred to herein as solution "A", was prepared by adding 7,000 grams of deionized water to a clean, dry 2 gallon container. With stirring, 1.0 gram of 70% nitric acid was added and set aside.

15.5 grams (~0.10 moles) of 98% TMOS (tetramethoxysilane) representing ~6 grams of $SiO_2$ was added to a clean, dry 1 liter glass beaker. 3.6 grams of solution A (~0.20 moles of $H_2O$) was slowly added to the TMOS, controlling the exotherm by using an ice bath to maintain the temperature below 25° C. Upon the completion of the addition of solution A, this partially hydrolyzed silane solution was held for one hour at ~25° C. In a separate clean, dry beaker, 290.5 grams of ethanol and 290.5 grams of deionized water were mixed and then added to the partial hydrolyzate with stirring, after the one hour hold time. Then the pH of the diluted silane solution (pH~5) was adjusted to pH~3.9 by adding 0.80 grams of glacial acetic acid with stirring. The resultant 1% SiO2 binder solution was allowed to fully hydrolyze overnight with stirring.

Application on test panels with, above solution show good wetting with no optical flaws and passes 50 flood/dry cycles maintaining good hydrophilicity.

Example 2

Preparation of a Hydrolyzed Organosilicate Binder 15.5 grams (~0.10 moles) of 98% TMOS representing ~6-grams of $SiO_2$ and 3.6 grams of anhydrous methanol (co-solvent) were added to a clean, dry 1 liter glass beaker. 3.6 grams of solution A (~0.20 moles of $H_2O$) was slowly added to the TMOS solution, controlling the exotherm by the rate of addition of solution A. The peak temperature attained during the addition was 33° C. Upon the completion of the addition of solution A, this partially hydrolyzed silane solution was held for one hour at ~25° C. In a separate, clean, dry beaker, 287 grams of ethanol and 290.5 grams of deionized water was mixed and then added to the partial hydrolyzate with stirring, after the one hour hold time. Then, the pH of the diluted silane solution (pH~5) was adjusted to pH~3.9 by adding 0.80 grams of glacial acetic acid with stirring. The resulting 1% $SiO_2$ binder solution was allowed to fully hydrolyze overnight with stirring.

Application on test panels with above solution show dewetting problems with mottling. The test results suggest that the inclusion of cosolvent provided for a more efficient hydrolysis and corresponding condensation to form higher molecular weight oligomers which demonstrated the observed behavior upon application.

Example 3

Preparation of a Hydrolyzed Organosilicate Binder 15.5 grams (~0.10 moles) of 98% TMOS (tetramethoxysilane) representing ~6 grams of $SiO_2$ was added to a clean, dry 1 liter glass beaker. 3.6 grams of solution A (~0.20 moles of $H_2O$) was slowly added to the TMOS, controlling the exotherm by the rate of addition of solution A. The peak temperature attained during the addition was 40° C. Upon the completion of the addition of solution A, this partially hydrolyzed silane solution was held for one hour at ~25° C. In a separate clean, dry beaker, 290.5 grams of ethanol and 290.5 grams of deionized water were mixed and then added to the partial hydrolyzate with stirring, after the one hour hold time. Then, the pH of the diluted silane solution (pH~5) was adjusted to pH~3.9 by adding 0.80 grams of glacial acetic acid with stirring. The 1% SiO2 binder solution was allowed to fully hydrolyze overnight with stirring.

Application on test panels with above solution show dewetting problems with mottling. The test results suggest that by not controlling the exotherm and allowing the temperature of the hydrolysis to reach ~40° C., resulted in a much higher degree of condensation to form higher molecular weight oligomers which demonstrated the observed behavior upon application.

Example 4

Preparation of a Hydrolyzed Organosilicate Binder

Methanol and deionized water were mixed at 1:1 (w:w) ratio under stirring. The mixture was cooled to room temperature. 10.0 g of MS-51 silicate solution (Mitsubishi Chemical Corporation, Tokyo, Japan) was charged into a glass reactor, followed by addition of 504.8 g f the pre-mixed methanol/water solvent mixture as one portion. The solution was stirred at 20-22 IC for 15 minutes. Then, 5.2 g of glacial acetic acid was added into the reactor under agitation. The solution mixture was kept stirred at ambient for additional 24 hours. The final $SiO_2$ content of the solution was 1% with a pH of 3.5.

Example 5

Preparation of a Hydrolyzed Organosilicate Binder 1-propanol and deionized water were mixed at 1:1 (w:w) ratio under stirring. The mixture was cooled to room temperature. In a separate container, acetic acid solution was prepared by diluting 10.0 g of glacial acetic acid with 90.0 g of 1-propanol/water solvent mixture. 5.0 g of MS-51 silicate solution was charged into a glass reactor, followed by addition of 253.7 g of the pre-mixed 1-propanol/water solvent mixture as one portion. The solution was stirred at 20-22° C. for 15 minutes. Then 1.4 g of pre-prepared acetic acid solution was added into the reactor under agitation. The solution mixture was kept stirred at ambient for additional 24 hours. The final $SiO_2$ content of the solution was 1% with a pH of 4.1.

Example 6

Preparation of Liquid Compositions

Liquid compositions A through G in Table 1 were prepared as follows. Charge I was prepared in a one liter, glass vessel equipped with a magnetic stirrer. Charge I was prepared by adding the binder material to the vessel and then adding deionized water to the vessel under agitation. The pH of the mixture was adjusted to 1.8 by adding 2N hydrochloric acid under agitation until the desired pH was achieved.

Charge II was prepared in a 4 oz. glass container equipped with a magnetic stirrer. Titania sol was added to this vessel and the pH was adjusted to 1.8 by adding 2N hydrochloric acid under agitation until the desired pH was achieved. Charge II was then added under agitation to Charge I to produce the hydrophilic compositions A through G.

TABLE 1

| Composition | Silicate/$TiO_2$ Weight Ratio | Binder[1] | DI Water | Titania Sol[2] | Titania Sol[3] |
|---|---|---|---|---|---|
| A | 0.5/0.3 | 500 g | 480 g | 20 g | — |
| B | 0.5/0.3 | 500 g | 480 g | 20 g | — |
| C | 0.4/0.24 | 40 g | 58.4 g | 1.6 g | — |
| D | 0.31/0.19 | 31 g | 67.7 g | 1.27 g | — |
| E | 0.25/0.25 | 25 g | 73.3 g | 1.67 g | — |
| F | 0.9/0.1 | 47 g | 2.3 g | 0.33 g | — |
| G | 0.5/0.3 | 25 g | 24.5 g | — | 0.5 g |

[1]MSH-200 hydrolyzed organosilicate (1% solids) commercially available from Mitsubishi Chemical Corporation, Tokyo, Japan.
[2]NTB-1 titania sol commercially available from Showa Denko K.K., Tokyo, Japan.
[3]STS-01 titania sol commercially available from Ishihara Sangyo Kaisha Ltd.

Example 7

Float Glass Test Substrates

The surface of 9"×12" float glass test substrates were prepared by cleaning the substrate with a diluted Dart 210 solution (commercially available from Madison Chemical Co. Inc.) prepared by diluting concentrated Dart 210 with deionized water so that the solution had a concentration of 5% to 10% Dart 210. The substrate was then rinsed with hot tap water and then deionized water. The test substrate was sprayed with Windex® and wiped dry with a paper towel (Kaydry® commercially available from Kimberly-Clark Corp.).

The liquid compositions of Example 6 were each applied to a test substrate by wipe application using a BLOODBLOC Protective Pad, commercially available from Fisher Scientific. The pad was wrapped around the foam applicator. Then, 1.5 grams of the hydrophilic composition was applied to the pad using an eye dropper or plastic bottle with a dropper top. The compositions were then applied by contacting the wet pad with the glass test substrate with straight, slightly overlapping strokes. After application, the substrates was allowed to dry at room temperature for at least 2 prior to testing. Results are summarized in Table 2

TABLE 2

| Composition | Ti ($\mu g/cm^2$)[1] | PCA ($cm^{-1}min^{-1}$)[2] | Surface Resistivity (ohms/cm$^2$)[3] | Haze[4] |
|---|---|---|---|---|
| A | 1.2 | 3.9 | $3.84 \times 10^9$ | 0.1% |
| B | 2.3 | 8.1 | $6.25 \times 10^8$ | 0.2% |
| C | 0.7 | 2.1 | — | — |
| D | 0.5 | 1.3 | — | — |
| E | 0.7 | 2.6 | — | — |
| F | 0.4 | 0.6 | — | — |
| G | 1.9 | 5.5 | — | — |

[1]Sample analyzed using X-ray fluorescence analysis.
[2]Photocatalytic activity was evaluated as described in U.S. Pat. No. 6,027,766 at col. 11, line 1 to col, 12, line 55.
[3]Surface resistivity was evaluated with an ACL Statitide Model 800 Megohmeter using either (1) large extension probes placed 5 millimeters apart at several locations on the sample, or (2) the meter's onboard probes spaced 2¾ inches apart at several locations on the sample.
[4]Haze was evaluated with a Hazegard® Model No. XL-211 haze meter, available from Pacific Scientific Company, Silver Spring, Md.

Durability Testing

Test 1

Test substrates coated with liquid compositions A and B were placed in a Cleveland Condensation Chamber operating at 140° F. (60° C.). Each test substrate was removed from the chamber weekly and tested to determine the water contact angle. The photoactivity of the composition was determined by measuring the water contact angle difference before and after exposure of the substrate to UV light. The exposure interval was 2 hours to a UVA-340 lamp supplied by the Q-Panel Company of Cleveland, Ohio or direct sunlight. The water contact angles reported were measured by the sessile drop method using a modified captive bubble indicator manufactured by Lord Manufacturing, Inc., equipped with Gartner Scientific goniometer optics. The surface to be measured was placed in a horizontal position, facing upward, in front of a light source. A sessile drop of water was placed on top of the surface in front of the light source so that the profile of the sessile drop could be viewed and the contact angle measured in degrees through the goniometer telescope which is equipped with circular protractor graduations. Results are summarized in Table 3.

TABLE 3

| | Composition A | | Composition B | |
|---|---|---|---|---|
| Hours in CCC | Contact Angle Before Exposure | Contact Angle After Exposure | Contact Angle Before Exposure | Contact Angle After Exposure |
| 0 | 20 | 3 | 12 | 3 |
| 498 | 14 | 3 | 12 | 3 |
| 1062 | 38 | 3 | 37 | 3 |
| 1535 | 32 | 3 | 27 | 3 |
| 2221 | 18 | 4 | 9 | 3 |
| 2573 | 30 | 3 | 26 | 3 |
| 2975 | 30 | 5 | 33 | 4 |
| 3565 | — | — | 30 | 5 |
| 4040 | — | — | 19 | 4 |

Durability Testing

Test 2

The durability of test substrates coated with liquid compositions A through G was tested by measuring the water contact angle after exposure to UV light as described above but prior to placement in the Cleveland Condensation Chamber. The same substrates were then placed, in the CCC as described above for at least 4000 hours and then removed. The substrates were then exposed to UV light as described above and tested by measuring the water contact angle. Results are summarized in Table 4.

TABLE 4

| Composition | Contact Angle Before CCC Exposure | Contact Angle After 4000 Hours CCC |
|---|---|---|
| A | 3 | 5 |
| B | 3 | 4 |
| C | 5 | 4 |
| D | 5 | 3 |
| E | 6 | 2 |
| F | 5 | 9 |
| G | 3 | 3 |

Durability Testing

Test 3

The durability of test substrates coated with compositions of the present invention was also compared to substrates coated with compositions comprising hydrophilic organosilicate binder but no the photocatalytic material. Hydrophilic compositions B and F of Example 6 as well as a similar composition having a binder to titanium dioxide ratio of 0.95/0.5 (composition J) were placed in the Cleveland Condensation Chamber as described above a periodically removed and exposed to UV light as described above. Comparative composition A was Shinsui Flow MS-1200, available from Dainippon Shikizai, Tokyo, Japan and comparative composition B was MSH-200, available from Mitsubishi Chemical Corporation, Tokyo, Japan. The test substrates were tested for water contact angle as described above. Results are illustrated in FIG. 4.

Example 8

Preparation of Liquid Compositions

Liquid compositions H and I were prepared in the manner described in Example 1 except that WINDEX was included in the composition in the amount identified in Table 5 and the Binder/$TiO_2$ Weight Ratio was as set forth in Table 5. The durability of these compositions was then analyzed in the manner described in Durability Testing—Test 1. Results are set fourth in Table 6.

TABLE 5

| Composition | Silicate/$TiO_2$ Weight Ratio | Amount of Binder/$TiO_2$[1] | Amount of WINDEX |
|---|---|---|---|
| H | 0.35/0.25 | 30 g | 8.91 g |
| I | 0.35/0.25 | 30 g | 6.26 g |

TABLE 6

| | Composition H | | Composition I | |
|---|---|---|---|---|
| Hours in CCC | Contact Angle Before Exposure | Contact Angle After Exposure | Contact Angle Before Exposure | Contact Angle After Exposure |
| 0 | 4 | 4 | 5 | 4 |
| 330 | 27 | 2 | 21 | 2 |
| 834 | 19 | 2 | 31 | 2 |
| 2390 | 26 | 3 | 23 | 5 |
| 3374 | 18 | 3 | 16 | 3 |
| 4022 | 38 | 4 | 32 | 11 |

Example 9

Turbidity of Liquid Compositions

Liquid compositions K, L, M, and O were prepared in the manner described in Example 6 except that the pH was adjusted to the value set forth in Table 7 and the Binder/$TiO_2$ Weight Ratio was as adjusted as set forth in Table 7. Liquid compositions N, P, and Q were prepared in a manner similar to Example 6, except that the pH of Charge I was not adjusted, and Charge II was a mixture of the titania sol and deionized water in an amount sufficient to dilute the titania sol from 15% solids to 2% solids with deionized water. The pH of Charge II was not adjusted and Charge II was added to Charge I to make the liquid composition. The turbidity of these compositions was then analyzed over time by a Turbidimeter, Model DRT-100D, manufactured by Shaban Manufacturing Inc, H. F. Instruments Division using a sample cuvette of 28 mm diameter by 91 mm in length with a flat bottom. Results are set forth in Table 7.

TABLE 7

| | | | Turbidity (NTU) | | | |
|---|---|---|---|---|---|---|
| Composition | Silicate/$TiO_2$ Weight Ratio | pH | Initial | 1 month | 3 months | 6 months |
| K | 0.5/0.3 | 1.96 | 490 | 558 | 569 | 652 |
| L | 0.5/0.3 | 1.57 | 438 | 552 | 567 | 653 |
| M | 0.35/0.2 | 1.8 | 321 | 383 | 393 | 442 |
| N | 0.35/0.2 | 3.25 | 454 | 412 | 385 | 425 |
| O | 0.4/0.25 | 1.8 | 415 | 488 | 511 | 573 |
| P | 0.5/0.1 | 3.1 | 145 | 143 | 145 | 153 |
| Q | 0.9/0.1 | 3.11 | 149 | 143 | 145 | 162 |

Example 10

Fogging Resistance on a Plastic Lens

This example is intended to illustrate the anti-fogging properties of the present invention. Thermoplastic polycarbonate lenses that were previously coated by the supplier with a non-tintable hardcoat (Gentex® PDQ®, commercially available from Gentex Optics, Inc.) were surface treated by washing with soap and water, rinsing with deionized water and iso-propyl alcohol, and air drying. The lenses were then plasma treated. For example, 10A no additional coating was applied to the lens. For example 10B, the plasma-surface treated lens was coated with MSH-200 hydrolyzed organosilicate (1% solids) commercially available from Mitsubishi Chemical Corporation, Tokyo, Japan. For Example 10C, the plasma-surface treated lens was coated with a composition of the type described in Example 6, composition E by dip coating at an extraction rate of 230 mm/min.

Fogging property was evaluated by placing the lens over a cup filled with hot water. The lens of Example 10A fogged over the entire area thereof. The lens of Example 10B fogged over 50-60% of the area thereof. The lens of Example 10C has not fogging on the surface thereof.

Example 11

Resistance to Fouling by Automotive Break Dust

This Example is intended to illustrate the anti-fouling properties of the present invention. Two aluminum alloy wheels purchased from DaimlerChrysler were divided into five even areas using masking tape. The wheels were installed on a 1996 model Chrysler Jeep Cherokee with one wheel (wheel #1) being installed on the front passenger side, and the other wheel (wheel #2) being installed on the front driver's side. Prior to installation, the five areas, of each of wheel #1 and wheel #2 were treated as follows.

Wheel #1 Preparation

Prior to installation on the vehicle, the five areas of wheel #1 were treated as follows. No coating was applied to Area 1. Area 2 was coated with Hi-Gard™1080 (an organosilane-containing coating solution available from PPG Industries, Inc.) by curtain coating using a wash bottle, air drying for 5 minutes, and the baking at 240° F. (116° C.) for 3 hours. Area 3 was coated with Hi-Gard 1080 as described above for Area #2. After baking, Area 3 was then coated with MSH-200 hydrolyzed organosilicate (1% solids) commercially available from Mitsubishi Chemical Corporation, Tokyo, Japan by wipe on application with a soaked sponge. The MSH-200 was then allowed to air dry and self-condense. Area 4 was coated with Hi-Gard 1080 as described above for Area 2. After baking, Area 4 was coated with a composition of the type described in Example 6, composition E and a mixture of deionized water and ethanol (50/50 weight ratio) by using a soaked sponge. Area 5 was coated with a composition of the described in Example 6, composition E.

The vehicle was driven for one week. Areas 1 through 5 of wheel #1 showed no significant difference in cleanliness prior to a water rinse. After being rinsed with water from a garden hose, the cleanliness of Areas 1 to 5 of wheel #1 was measured on a scale of 1 to 10 with higher number reflecting a cleaner surface. The results are summarized in Table 8.

TABLE 8

| Area | Cleanliness |
|---|---|
| 1 | 2 |
| 2 | 6 |
| 3 | 8 |
| 4 | 10 |
| 5 | 10 |

Wheel #2 Preparation

Prior to installation on the vehicle, the five areas of wheel #2 were treated as follows. No coating was applied to Area 1. Area 2 was coated with SolGard®330 coating (an organosilane-containing coating solution available from PPG Industries, Inc.) by curtain coating using a wash bottle, air drying for 5 minutes, and the baking at 240° F. (116° C.) for 3 hours. Area 3 was coated with Hi-Gard 1080 as described above for Area 2. After baking, Area 3 was then coated with MSH-200 hydrolyzed organosilicate (1% solids) commercially available from Mitsubishi Chemical Corporation, Tokyo, Japan by wipe on application with a soaked sponge. The MSH-200 was then allowed to air dry and self-condense. And 4 was coated with Hi-Gard 1080 as described above for Area 2. After baking, Area 4 was coated with a composition of the type described in Example 6, composition E and a mixture of deionized water and ethanol (50/50 weight ratio) by wipe-on application using a soaked sponge. Area 5 was coated with a composition of the type described in Example 6, composition E.

The vehicle was driven for one week. Areas 1 through 5 of wheel #1 showed no significant difference in cleanliness prior to a water rinse. After being rinsed with water from a garden hose, the cleanliness of Areas 1 to 5 of wheel #1 was measured on a scale of 1 to 10 with higher number reflecting a cleaner surface. The results are summarized in Table 9.

TABLE 9

| Area | Cleanliness |
|---|---|
| 1 | 2 |
| 2 | 8 |
| 3 | 10 |
| 4 | 10 |
| 5 | 10 |

Examples 12A and 12B

Application to Painted Surface

Example 12A: A liquid composition was prepared by adding three grams of Surfynol 465 (available from Air Products) to 100 grams of a liquid composition of the type described in Example 6, composition E and stirring the mixture.

Panel Preparation

Aluminum panels, pre-treated with Betz Permatreat 1500, were coated with Truform® ZT high gloss white polyester coating (available from PPG Industries, Inc) by using a wire wound drawdown bar at 0.7-0.8 mil dry film thickness. The coated aluminum panel was baked at 450° F. (peak metal temperature) for 30 seconds. For Example 12(1), no additional coating was added. For Example 12(2), the above prepared hydrophilic composition was applied over Truform ZT-painted aluminum panel by using wire wound drawdown bar at 0.05-0.15 mil dry film thickness. The panel was baked at 350° F. (peak metal temperature) for 25 seconds.

Exposure Test Results

Coated panel and un-coated panels were compared after six months in Malaysia. Results are set forth in Table 10.

TABLE 10

| | 6 Months Malaysia Position of Panel: horizontal | | 3 months south Florida Position of panel: 45° south | |
|---|---|---|---|---|
| Example | Unwashed $\Delta L^1$ | Washed $\Delta L$ | Unwashed $\Delta L$ | Washed $\Delta L$ |
| 12(1) | −21.6 | −13.82 | −6.05 | −4.02 |
| 12(2) | −8.30 | −1.00 | −3.35 | −0.01 |

[1]Lightness (L) was determined using a MacBeth Color Eye ® 2145 Spectrophotometer, available from the Macbeth division of Kollmorgen Instruments. Lightness measurements were taken before and after exposure testing and the difference (dL) recorded. A dL value closer to zero (positive or negative) indicates better performance. A low $\Delta L$ value means less color change. A negative value means the coating got darker color comparing to the original color reading. A low $\Delta$ in un-washed area would indicate that the panel was less dirty without washing.

Example 12B: Aluminum panels, pre-treated with Betz Permatreat 1500, were coated with Duranar® Semi Gloss coating (available from PPG Industries, Inc.) in a manner similar to that described in Example 12A.

For Example 12(3), the liquid composition described in Example 12A was applied over the Duranar painted aluminum panel by using wire wound drawdown bar at 0.05-0.15 mil dry film thickness. The panel was baked at 350° F. (peak metal temperature) for 25 seconds. For Example 12(4), Toto Frontier Research Co., Ltd. finished the painted panel with titanium dioxide-containing low maintenance clearcoat. The panels of Examples 12(3) and 12(4) were exposed at South Florida for 13 month and 14 months. Cracking was observed on the panel of Example 12(4) and no cracking was observed on the panel of Example 12(4).

Example 13

Application to Millwork Substrate

Sample preparation: Control samples were lab generated or commercial production panels finished with a commercial solventborne polyurethane millwork coating. Test parts were prepared by first wiping the parts with isopropanol. Next, liquid compositions of the type described in Example 6, composition E were applied by lightly wiping a soaked paper cloth over the part. Coatings were air dried overnight. Samples were prepared over four substrates; phenolic paper clad door substrate (FWD), fiberglass pultrusion (pult), vinyl-clad fiberglass pultrusion (VCP), and pine window substrate (NLP). Samples were sent to an exposure site in Malaysia for three months exposure prior to being returned and evaluated for color change and gloss retention. Results are set forth in Table 11.

TABLE 11

| | Substrate | | | | | | | |
|---|---|---|---|---|---|---|---|---|
| | NLP | | FWD | | Pult. | | VCP | |
| Sample | Control | Example 7A | Control | Example 7B | Control | Example 7C | Control | Example 7D |
| Color change | 14.3 | 8.9 | 12.7 | 4.7 | 16.4 | 2.7 | 10.8 | 2.3 |
| % Gloss Retention | 54 | 47 | 76 | 108 | 69 | 87 | 71 | 71 |

It will be readily appreciated by those skilled in the art that modifications may be made to the invention without departing from the concepts disclosed in the foregoing description. Such modifications are to be considered as included within the following claims unless the claims, by their language, expressly state otherwise. Accordingly, the embodiments described in detail herein are illustrative only and are not limiting to the scope of the invention, which is to be given the full breadth of the appended claims and any and all equivalents thereof.

We claim:

1. A method of coating a substrate comprising:
    (a) applying to the substrate a liquid composition comprising (1) a photocatalytic material present in an amount ranging from 0.1 to 0.75 percent by weight of the composition, (2) a hydrophilic essentially completely hydrolyzed organosilicate comprising silanol groups present in the liquid composition in an amount ranging from 0.1 to 2 percent by weight calculated as $SiO_2$, based on the total weight of the composition, and (3) water present in an amount sufficient to prevent a condensation reaction of the silanol groups, and
    (b) curing the composition applied in step (a) to provide a coating layer that has a dry film thickness of 10 to 100 nanometers.

2. The method of claim 1, wherein the composition is cured by exposing the composition to air for at least two hours at 25° C.

3. The method of claim 1, wherein the substrate comprises cement.

4. The method of claim 1, wherein the substrate comprises glass.

5. The method of claim 1, wherein the liquid composition further comprises an antimicrobial agent.

6. The method of claim 5, wherein the antimicrobial agent comprises silver.

7. The method of claim 1, wherein at least a portion of the photocatalytic material is present in the form of particles having an average crystalline diameter of 3 to 35 nanometers.

8. The method of claim 1, wherein the photocatalytic material is selected from the group consisting of the brookite form of titanium dioxide, titanium dioxide chemically modified by flame pyrolysis, nitrogen doped titanium dioxide, plasma treated titanium dioxide, and mixtures thereof.

9. The method of claim 1, wherein the pH of the liquid composition is no more than 3.5.

10. The method of claim 1, wherein the dry film thickness of the coating layer is 20 to 60 nanometers.

11. The method of claim 1, wherein the coating layer exhibits an initial water contact angle of no more than 10° prior to photoexcitation of the photocatalytic material.

12. The method of claim 1, wherein, following excitation of the photocatalytic material, the coating layer exhibits a contact angle with water of less than 5°.

* * * * *